US010985884B2

(12) United States Patent
Solano Arenas et al.

(10) Patent No.: US 10,985,884 B2
(45) Date of Patent: Apr. 20, 2021

(54) SEARCH SPACE CONFIGURATION FOR SHORT TRANSMISSION TIME INTERVAL

(71) Applicant: Telefonaktiebolaget LM Ericsson (publ), Stockholm (SE)

(72) Inventors: John Camilo Solano Arenas, Dusseldorf (DE); Niklas Andgart, Södra Sandby (SE); Laetitia Falconetti, Järfälla (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 16/346,257

(22) PCT Filed: May 4, 2018

(86) PCT No.: PCT/EP2018/061603
§ 371 (c)(1),
(2) Date: Apr. 30, 2019

(87) PCT Pub. No.: WO2018/202893
PCT Pub. Date: Nov. 8, 2018

(65) Prior Publication Data
US 2020/0067668 A1    Feb. 27, 2020

Related U.S. Application Data

(60) Provisional application No. 62/502,471, filed on May 5, 2017.

(51) Int. Cl.
*H04L 5/00*      (2006.01)
(52) U.S. Cl.
CPC .......... *H04L 5/0048* (2013.01); *H04L 5/0005* (2013.01)

(58) Field of Classification Search
CPC ... H04L 5/0048; H04L 5/0005; H04L 5/0091; H04L 5/001; H04L 5/0023; H04L 5/0082; H04L 1/00; H04L 5/0053
See application file for complete search history.

(56) References Cited

U.S. PATENT DOCUMENTS

2013/0114529 A1* 5/2013 Chen .................. H04L 1/1829
                                                        370/329
2013/0170449 A1* 7/2013 Chen .................. H04W 72/042
                                                        370/329
(Continued)

OTHER PUBLICATIONS

3GPP TSG RAN WG1 Meeting #72 RP-161299; Title: New Work Item on shortened TTI and processing time for LTE; Agenda Item: 10.1.1; Source: Ericsson; Document for: Approval; Location and Date: Busan, Korea, Jun. 13-16, 2016, consisting of 9-pages.
(Continued)

*Primary Examiner* — Jay P Patel
(74) *Attorney, Agent, or Firm* — Christopher & Weisberg, P.A.

(57) ABSTRACT

A method in a network node for supporting a predetermined set of aggregation levels for configuration of a downlink control channel for one of a slot Transmission Time Interval (TTI) and a subslot TTI. The method includes determining an aggregation level to be monitored by a wireless device (WD) in a communication network; and determining a number of downlink control channel candidates for the WD to monitor within each of the one of the slot TTI and the subslot TTI, the number of downlink control channel candidates based upon the aggregation level. A wireless device and corresponding method for supporting a predetermined set of aggregation levels and for implementing at least one aggregation level and at least one downlink control channel candidate for configuration of a downlink control channel for one of a slot TTI and a subslot TTI are also provided.

28 Claims, 20 Drawing Sheets

(56) References Cited

U.S. PATENT DOCUMENTS

| | | | | |
|---|---|---|---|---|
| 2013/0194931 | A1* | 8/2013 | Lee | H04L 5/0053 370/241 |
| 2015/0295689 | A1* | 10/2015 | Lee | H04L 5/001 370/329 |
| 2018/0049175 | A1* | 2/2018 | Bagheri | H04L 41/08 |
| 2019/0261330 | A1* | 8/2019 | Hwang | H04L 5/0092 |

OTHER PUBLICATIONS

3GPP TS 36.211 V14.2.0; 3rd Generation Partnership Project; Technical Specification Group Radio Access Network; Evolved Universal Terrestrial Radio Access (E-UTRA); Physical channels and modulation (Release 14); Mar. 2017, consisting of 194-pages.
3GPP TS 36.213 V14.2.0; 3rd Generation Partnership Project; Technical Specification Group Radio Access Network; Evolved Universal Terrestrial Radio Access (E-UTRA); Physical layer procedures (Release 14); Mar. 2017, consisting of 454-pages.
International Search Report and Written Opinion dated Jul. 23, 2018 for International Application No. PCT/EP2018/061603 filed on May 4, 2018, consisting of 10-pages.
3GPP TSG RAN WG1 Meeting #88b R1-1704264; Title: Discussion on sPDCCH design; Agenda Item: 7.2.1.2.2.2; Source: Huawei, HiSilicon; Document for: Discussion and decision; Location and Date: Spokane, USA, Apr. 3-7, 2017, consisting of 16-pages.
3GPP TSG RAN WG1 Meeting #88bis R1-1704640; Title: sPDCCH design for short TTI; Agenda Item: 7.2.1.2.2.2; Source: ZTE, ZTE Microelectronics; Document for: Discussion and Decision; Location and Date: Spokane, USA Apr. 3-7, 2017, consisting of 9-pages.
3GPP TSG RAN WG1 Meeting #88bis R1-1705545; Title: Control signalling for shortened TTI; Agenda Item: 7.2.1.2.2.2; Source: Motorola Mobility, Lenovo; Document for: Discussion; Location and Date: Spokane, USA, Apr. 3-7, 2017, consisting of 5-pages.

* cited by examiner

FIG. 12

SEARCH SPACE CONFIGURATION FOR SHORT TRANSMISSION TIME INTERVAL

CROSS-REFERENCE TO RELATED APPLICATIONS

This application is a Submission Under 35 U.S.C. § 371 for U.S. National Stage Patent Application of International Application No.: PCT/EP2018/061603, filed May 4, 2018 entitled "SEARCH SPACE CONFIGURATION FOR SHORT TRANSMISSION TIME INTERVAL," which claims priority to U.S. Provisional Application No. 62/502,471, filed May 5, 2017, entitled "SEARCH SPACE AND sPDCCH-PRB-SET CONFIGURATION FOR SHORT TTI," the entireties of both of which are incorporated herein by reference.

TECHNICAL FIELD

Wireless communications, and in particular, a method, a network node, and a wireless device for configuration of a downlink control channel for a short Transmission Time Interval (sTTI).

BACKGROUND

Packet data latency is one of the performance metrics that vendors, operators and also end-users (via speed test applications) regularly measure. Latency measurements are done in all phases of a radio access network system lifetime, when verifying a new software release or system component, when deploying a system and when the system is in commercial operation.

Shorter latency than previous generations of 3GPP RATs was one performance metric that guided the design of Long Term Evolution (LTE). LTE is also now recognized by the end-users to be a system that provides faster access to internet and lower data latencies than previous generations of mobile radio technologies.

Packet data latency is important not only for the perceived responsiveness of the system; it is also a parameter that indirectly influences the throughput of the system. HTTP/TCP is the dominating application and transport layer protocol suite used on the internet today. According to HTTP Archive (http://httparchive.org/trends.php) the typical size of HTTP based transactions over the internet are in the range of a few 10's of Kbytes up to 1 Mbyte. In this size range, the TCP slow start period is a significant part of the total transport period of the packet stream. During TCP slow start the performance is latency limited. Hence, improved latency can rather easily be showed to improve the average throughput, for this type of TCP based data transactions.

Radio resource efficiency can be positively impacted by latency reductions. Lower packet data latency can increase the number of transmissions possible within a certain delay bound; hence higher Block Error Rate (BLER) targets can be used for the data transmissions freeing up radio resources, potentially improving the capacity of the system.

One area to address when it comes to packet latency reductions is the reduction of transport time of data and control signaling, by addressing the length of a transmission time interval (TTI). In LTE release 8, a TTI corresponds to one subframe (SF) of length 1 millisecond. One such 1 ms TTI is constructed by using 14 OFDM or SC-FDMA symbols in the case of normal cyclic prefix and 12 OFDM or SC-FDMA symbols in the case of extended cyclic prefix.

Currently, work in the 3$^{rd}$ Generation Partnership Project (3GPP) (see RP-161299) is ongoing to standardize "short TTI" or "sTTI" operation, where scheduling and transmission can be done on a faster timescale. Therefore, the legacy LTE subframe is subdivided into several sTTIs. Supported lengths for sTTI of 2, 4 and 7 OFDM symbols are currently discussed. Data transmission in the downlink (DL) may happen per sTTI via the short physical downlink shared channel (sPDSCH), which may include a control region short downlink control channel (sPDCCH). In the uplink (UL), data is transmitted per sTTI via short physical uplink shared channel (sPUSCH); control can be transmitted via the short physical uplink control channel (sPUCCH).

Different alternatives are possible to schedule an sTTI in the UL or DL to a wireless device. In one alternative, individual wireless devices receive information about sPDCCH candidates for sTTI via RRC configuration, telling the wireless device where to look for the control channel for sTTI, i.e., sPDCCH. The DCI for sTTI is actually included directly in sPDCCH. In another alternative, the DCI for sTTI is split into two parts, a slow DCI sent in PDCCH and a fast DCI sent in sPDCCH. The slow grant can contain the frequency allocation for a DL and an UL short TTI band to be used for short TTI operation, and it can also contain refinement about sPDCCH candidate locations.

3GPP Long Term Evolution (LTE) technology is a mobile broadband wireless communication technology in which transmissions from base stations (referred to as eNBs) to mobile stations (also referred to as user equipment (UE)) are sent using orthogonal frequency division multiplexing (OFDM). OFDM splits the signal into multiple parallel sub-carriers in frequency. The basic unit of transmission in LTE is a resource block (RB) which in its most common configuration consists of 12 subcarriers and 7 OFDM symbols (one slot) in the case of normal cyclic prefix. In the case of extended cyclic prefix, a RB consists of 6 OFDM symbols in the time domain. A common term is also a physical resource block (PRB) to indicate the RB in the physical resource. Two PRBs in the same subframe that use the same 12 subcarriers are denoted a PRB pair. This is the minimum resource unit that can be scheduled in LTE.

A unit of one subcarrier and 1 OFDM symbol is referred to as a resource element (RE) see FIG. 1. Thus, a PRB consists of 84 REs. An LTE radio subframe is composed of multiple resource blocks in frequency with the number of PRBs determining the bandwidth of the system and two slots in time as shown in FIG. 2

In the time domain, LTE downlink transmissions are organized into radio frames of 10 ms, each radio frame consisting of ten equally-sized subframes of length $T_{subframe}$-1 ms.

Messages transmitted over the radio link to users can be broadly classified as control messages or data messages. Control messages are used to facilitate the proper operation of the system as well as proper operation of each wireless device within the system. Control messages could include commands to control functions such as the transmitted power from a wireless device, signaling of RBs within which the data is to be received by the wireless device or transmitted from the wireless device and so on.

In Rel-8, the first one to four OFDM symbols, depending on the configuration, in a subframe are reserved to contain such control information, as shown in FIG. 2. Furthermore, in Rel-11, an enhanced control channel was introduced (EPDCCH), in which PRB pairs are reserved to exclusively contain EPDCCH transmissions, although excluding from the PRB pair the one to four first symbols that may contain control information to wireless devices of releases earlier than Rel-11. See an illustration in FIG. 3.

Hence, the EPDCCH is frequency multiplexed with PDSCH transmissions, contrary to PDCCH which is time multiplexed with PDSCH transmissions. The resource allocation (RA) for PDSCH transmissions exists in several RA types, depending on the downlink control information (DCI) format. Some RA types have a minimum scheduling granularity of a resource block group (RBG), see 3GPP TS 36.211. An RBG is a set of adjacent (in frequency) resource blocks and when scheduling the wireless device, the wireless device is allocated resources in terms of RBGs and not individual RBs.

When a wireless device is scheduled in the downlink from an EPDCCH, the wireless device assumes that the PRB pairs carrying the DL assignment are excluded from the resource allocation, i.e., rate matching applies. For example, if a wireless device is scheduled PDSCH in a certain RBG of size 3 adjacent PRB pairs, and one of these PRB pairs contain the DL assignment, the wireless device assumes that the PDSCH is only transmitted in the two remaining PRB pairs in this RBG. Note also that multiplexing of PDSCH and any EPDCCH transmission within a PRB pair is not supported in Rel-11.

The PDCCHs and EPDCCHs are transmitted over radio resources that are shared between several user equipments (UE). Each PDCCH consists of smaller parts, known as control channel elements (CCE), to enable link adaptation (by controlling the number of CCE a PDCCH is utilizing). It is specified that for PDCCH, a wireless device has to monitor four (4) aggregation levels of CCEs, namely, 1, 2, 4, and 8, for wireless device-specific search space and 2 aggregation levels of CCEs, namely, 4 and 8, for common search space.

In 3GPP TS 36.213, Section 9.1.1, a search space $S_k^{(L)}$ at aggregation level $L \in \{1,2,4,8\}$ is defined by a contiguous set of CCEs given by $$(Z_k^{(L)}+i) \bmod N_{CCE,k} \quad (1)$$

where $N_{CCE,k}$ is the total number of CCEs in the control region of subframe k, $Z_k^{(L)}$ defines the start of the search space, $i=0, 1, \ldots, M^{(L)} \cdot L-1$ and $M^{(L)}$ is the number of PDCCHs to monitor in the given search space. Each CCE contains 36 QPSK modulation symbols. The value of $M^{(L)}$ is specified by Table 9.1.1-1 in 3GPP TS 36.213, as shown below:

TABLE 1

| Search space $S_k^{(L)}$ | | | Number of PDCCH candidates $M^{(L)}$ |
|---|---|---|---|
| Type | Aggregation level L | Size [in CCEs] | |
| Wireless device-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

With this definition, search space for different aggregation levels may overlap with each other regardless of system bandwidth. More specifically, wireless device-specific search space and common search space might overlap and the search spaces for different aggregation levels might overlap. See one example shown below where there are 9 CCEs in total and very frequent overlap between PDCCH candidates:

Example 1

$N_{CCE,k}=9$, $Z_k^{(L)}\{1, 6, 4, 0\}$ for $L=\{1, 2, 4, 8\}$, respectively (See Table 2 below).

TABLE 2

| Search space $S_k^{(L)}$ | | |
|---|---|---|
| Type | Aggregation Level L | PDCCH candidates in terms of CCE index |
| Wireless Device-Specific | 1 | {1}, {2}, {3}, {4}, {5}, {6} |
| | 2 | {6, 7}, {8, 0}, {1, 2}, {3, 4}, {5, 6}, {7, 8} |
| | 4 | {4, 5, 6, 7}, {8, 0, 1, 2} |
| | 8 | {0, 1, 2, 3, 4, 5, 6, 7}, {8, 0, 1, 2, 3, 4, 5, 6} |
| Common | 4 | {0, 1, 2, 3}, {4, 5, 6, 7}, {8, 0, 1, 2}, {3, 4, 5, 6} |
| | 8 | {0, 1, 2, 3, 4, 5, 6, 7}, {8, 0, 1, 2, 3, 4, 5, 6} |

After channel coding, scrambling, modulation and interleaving of the control information the modulated symbols are mapped to the resource elements in the control region. To multiplex multiple PDCCH onto the control region, control channel elements (CCE) has been defined, where each CCE maps to 36 resource elements. One PDCCH can, depending on the information payload size and the required level of channel coding protection, consist of 1, 2, 4 or 8 CCEs, and the number is denoted as the CCE aggregation level (AL). By choosing the aggregation level, link-adaptation of the PDCCH is obtained. In total there are $N_{CCE}$ CCEs available for all the PDCCH to be transmitted in the subframe and the number $N_{CCE}$ varies from subframe to subframe depending on the number of control symbols n and the number of antenna ports configured.

As $N_{CCE}$ varies from subframe to subframe, the wireless device needs to blindly determine the position and the number of CCEs used for its PDCCH which can be a computationally intensive decoding task. Therefore, some restrictions in the number of possible blind decodings a wireless device needs to go through have been introduced. For instance, the CCEs are numbered and CCE aggregation levels of size K can only start on CCE numbers evenly divisible by K, as shown in FIG. 4.

The set of candidate control channels formed by CCEs where a wireless device needs to blindly decode and search for a valid PDCCH are called search spaces. This is the set of CCEs on an AL a wireless device should monitor for scheduling assignments or other control information, see example in FIG. 5. In each subframe and on each AL, a wireless device will attempt to decode all the PDCCHs that can be formed from the CCEs in its search space. If the CRC checks, then the content of the PDCCH is assumed to be valid for the wireless device and it further processes the received information. Two or more wireless devices will often have overlapping search spaces and the network has to select one of them for scheduling of the control channel. When this happens, the non-scheduled wireless device is said to be blocked. The search spaces vary pseudo-randomly from subframe to subframe to minimize this blocking probability.

A search space is further divided to a common and a wireless device specific part. In the common search space, the PDCCH containing information to all or a group of wireless devices is transmitted (paging, system information, etc.). If carrier aggregation is used, a wireless device will find the common search space present on the primary component carrier (PCC) only. The common search space is restricted to aggregation levels 4 and 8 to give sufficient channel code protection for all wireless devices in the cell (since it is a broadcast channel, link adaptation cannot be used). The $m_8$ and $m_4$ first PDCCH (with lowest CCE number) in an AL of 8 or 4 respectively belongs to the common search space. For efficient use of the CCEs in the system, the remaining search space is wireless device specific at each aggregation level.

FIG. 5 is drawing showing the search space (indicated as "A") a certain wireless device needs to monitor. In total there are $N_{CCE}=15$ CCEs in this example and the common search space is indicated as "B."

A CCE consists of 36 QPSK modulated symbols that map to the 36 REs unique for this CCE. To maximize the diversity and interference randomization, interleaving of all the CCEs is used before a cell specific cyclic shift and mapping to REs, see the processing steps in FIG. 6. Note that in most cases some CCEs are empty due to the PDCCH location restriction to wireless device search spaces and aggregation levels. The empty CCEs are included in the interleaving process and mapping to RE as any other PDCCH to maintain the search space structure. Empty CCE are set to zero power and this power can instead be used by non-empty CCEs to further enhance the PDCCH transmission.

Furthermore, to enable the use of 4 antenna TX diversity, a group of 4 adjacent QPSK symbols in a CCE is mapped to 4 adjacent RE, denoted a RE group (REG). Hence, the CCE interleaving is quadruplex (group of 4) based and mapping process has a granularity of 1 REG and one CCE corresponds to 9 REGs (=36 RE).

There will also in general be a collection of REG that remains as leftovers after the set of size $N_{CCE}$ CCEs has been determined (although the leftover REGs are always fewer than 36 RE) since the number of REGs available for PDCCH in the system bandwidth is in general not an even multiple of 9 REGs. These leftover REGs are in LTE unused by the system.

Similar to PDCCH, the EPDCCH is transmitted over radio resources shared by multiple wireless devices and enhanced CCE (eCCE) is introduced as the equivalent to CCE for PDCCH. An eCCE has also a fixed number of RE but the number of RE available for EPDCCH mapping is generally fewer than this fixed number because many RE are occupied by other signals such as CRS and CSI-RS. Code chain rate matching is applied whenever a RE belonging to an eCCE contains other colliding signals such as the CRS, CSI-RS, legacy control region or in case of TDD, the GP and UpPTS.

Consider the example shown in FIG. 7, where (a) illustrates the PDCCH mapping, which avoids the CRS so that a CCE always consists of available RE. In (b), it is shown how the eCCE consists of 36 REs nominally, but the number of available REs is less in case there are colliding signals, hence RE for EPDCCH. Since the colliding signals is subframe dependent, the value of becomes subframe dependent as well and could even be different for different eCCEs if the collisions impact on the eCCEs unevenly.

It shall be noted that when the number of eCCE per PRB pair is 2, the nominal number of REs per eCCE is not 36 but instead 72 or 64 for normal and extended CP length respectively.

In 3GPP Rel-11, the EPDCCH supports only the wireless device specific search space whereas the common search space remains to be monitored in the PDCCH in the same subframe. In future releases, the common search space may be introduced also for EPDCCH transmission.

It is specified that the wireless device monitors eCCE aggregation levels 1,2,4,8,16 and 32 with restrictions shown.

In distributed transmission, an EPDCCH is mapped to resource elements in up to D PRB pairs, where D=2,4, or 8 (the value of D=16 is also being considered in 3GPP). In this way can frequency diversity be achieved for the EPDCCH message. See FIG. 8 for a schematic example.

FIG. 8 shows a downlink subframe showing 4 parts belonging to an EPDCCH is mapped to multiple of the enhanced control regions known as PRB pairs, to achieve distributed transmission and frequency diversity or subband precoding.

In localized transmission, an EPDCCH is mapped to one PRB pair only, if the space allows (which is always possible for aggregation level one and two and for normal subframes and normal CP length also for level four). In case the aggregation level of the EPDCCH is too large, a second PRB pair is used as well, and so on, using more PRB pairs, until all eCCEs belonging to the EPDCCH has been mapped.

FIG. 9 provides an illustration of localized transmission. In particular, FIG. 9 shows a downlink subframe showing the 4 eCCEs belonging to an EPDCCH is mapped to one of the enhanced control regions, to achieve localized transmission.

As an example, in normal subframe and with normal CP length and with $n_{EPDCCH} \geq 104$, localized transmission is using aggregation levels (1,2,4,8) and they are mapped to (1,1,1,2) PRB pairs respectively.

To facilitate the mapping of eCCEs to physical resources each PRB pair is divided into 16 enhanced resource element groups (eREGs) and each eCCE is split into 4 or 8 eREGs for normal and extended cyclic prefix, respectively. An EPDCCH is consequently mapped to a multiple of four or eight eREGs depending on the aggregation level.

The eREGs belonging to an ePDCCH reside in either a single PRB pair (as is typical for localized transmission) or a multiple of PRB pairs (as is typical for distributed transmission). The exact division of a PRB pair into eREG.

In order to quickly schedule low latency data on the short TTIs, a new short PDCCH (sPDCCH) can be defined. Since the short TTI operation is desired to coexist with legacy TTI operation, the sPDCCH should be placed in-band within PDSCH, still leaving resources for legacy data.

Legacy control channels PDCCH and EPDCCH use CRS and DMRS demodulation, respectively. For operation in both these environment, an sPDCCH should support both CRS and DMRS, and to maintain efficiently, resources not used by sPDCCH should be used by sPDSCH (short PDSCH).

To facilitate the definition of the sPDCCH mapping to resource elements, special entities are defined: short resource element group (sREG) and sCCE. This follows the methodology used so far in the LTE specifications for defining PDCCH and ePDCCH, as described above. Note that the definition of the same mapping can also be done without using these terms or by using equivalent terms.

The main candidate lengths for sPDCCH in the time domain are 1 or 2 OFDM symbols for sTTI operation. The REs of a PRB in a given OFDM symbol of the sTTI can build one or more sREGs. The number of REs in a sREG may also be variable in order to provide allocation flexibility and to support good frequency diversity.

The sREG configuration for sPDCCH is defined as the complete number of REs in a PRB within 1 OFDM symbol (i.e., 12 REs per sREG in 1 OFDM symbol). These sREG configurations are depicted in FIG. 10 considering 1 OFDM symbol sPDCCH, 2 OFDM symbol sPDCCH and 3 OFDM symbol sPDCCH. Each index, i.e. {0, 1, 2} (indicated as A, B and C, respectively), represents an sREG group.

The number of sREGs required to build up a sCCE for a given sPDCCH can vary as well as their placement scheme along the frequency resources used for sTTI operation. One option is to define an sCCE to be composed ideally by 36 REs like an eCCE or a CCE. For that, and based on FIG. 10, an sCCE is composed by three sREG, i.e. 1 sCCE=3 sREG.

For DMRS-based sPDCCH, a further option to consider in order to increase the number of REs available within 2 OFDM symbols SPDCCH is that an sCCE is defined to be composed by 48 REs instead of 36 REs, i.e., 1 sCCE=4 sREG. The 12 additional REs help compensating the DMRS overhead compared to CRS based sPDCCH.

In order to support good frequency diversity or a more localized placement, localized and distributed placement schemes of sREG building up the same sCCE are defined:

- Localized scheme: sREGs building the same sCCE can be localized in frequency domain to allow for a sPDCCH resource allocation confined in a limited frequency band. This facilitates the use of beamforming for DMRS based sPDCCH.
- Distributed scheme: A distributed sREG location can be used to allow frequency diversity gains. In this case, multiple wireless devices may have the sREG of their sPDCCH mapped to the same PRB on different REs. Distributing over a wide frequency range also more easily makes the sPDCCH fit into one single OFDM symbol. For wireless devices with DMRS based demodulation, user-specific beamforming is not recommended with distributed sCCE locations.

These schemes, which are described below for building sCCE based on 1 OFDM symbol sPDCCH, 2 OFDM symbol sPDCCH and 3 OFDM symbol sPDCCH, can be used for CRS and DMRS transmissions.

Likewise, this takes into account the following considerations:

- CRS and DMRS users can coexist on the same sTTI, since sPDCCH design is the same.
- If both CRS and DMRS users are given DCI in the same PRB, CRS users need to be indicated with this. Then they know that some REs are not used for sCCE. Otherwise, CRS and DMRS users have to be sent DCI in different PRBs.

At least one set of PRBs that can be used for sPDCCH is configured per user. It has been recommended to support the configuration of several sets of PRBs used for sPDCCH in order to configure one set of PRBs following the localized sPDCCH mapping and another set with the distributed mapping. The wireless device would monitor both sets and the network node could select the most favorable configuration/PRB set for a given sTTI and wireless device.

The set of PRBs assigned for the sPDCCH, which includes PRBs (not necessarily consecutive) from the available sTTI band, may be configured via RRC signaling. However, it may comprise a potential resource allocation refinement in the slow DCI transmitted in PDCCH, e.g., a reduced set of PRBs or a specific set in case that several sPDCCH sets were defined.

The set of PRBs may be configured independently, e.g., as a PRB bitmap. The set can also be configured based on groups of PRB. One example of already defined group of PRB in LTE is called RBG and can be used as basis in the proposed sPDCCH mapping. Then all PRBs within the same PRB group, e.g., RBG, are jointly used.

The PRBs or groups of PRBs included in the configured PRB set may be ordered according to a sequence signaled to the wireless device before mapping the sPDCCH to them.

1 OFDM symbol sPDCCH is defined for CRS based transmissions due to the advantage of early decoding for 2 OFDM symbol sTTI and slot TTI. 2 OFDM symbol sPDCCH can also be configured for both 2 OFDM symbol sTTI and slot TTI as an alternative to allow a small sTTI band, i.e., to limit the number of frequency resources used for sTTI operation.

For DMRS based transmissions with 2 OFDM symbol sTTI, assuming a design based on DMRS pairs in time domain as in legacy LTE, a 2 OFDM symbol sPDCCH is defined, since wireless devices need anyway to wait for the end of sTTI for channel estimation. In that case, DMRS is thus not shared between sPDCCH and sPDSCH in a given PRB of the sTTI. This gives more freedom for applying beamforming for sPDCCH. Furthermore, for some sTTI in a subframe the TTI length is 3 symbols instead of 2 symbols. To allow beamforming flexibility, a 3 symbol sPDCCH can be considered for the 3-symbol long sTTI.

For DMRS with 1-slot sTTI, a 2 symbols sPDCCH is suitable. One DMRS pair for 1-slot TTI is preferred to be able to do channel estimation for sPDCCH and early sPDCCH decoding. Likewise, 3 OFDM symbol sPDCCH is also suitable for 1-slot TTI for those cases with only few REs available within the first 2 symbols in the slot due to reference signals and other kind of overhead. Thereby, considering the presence of potential reference signals in a sTTI such as DMRS, CRS or CSI-RS, those REs occupied by these signals within a PRB are not used for a given sREG.

Assuming that sPDCCH spans only the first OFDM symbol of a 2 symbol sTTI and that an sCCE is composed of 36 REs like an ECCE or a CCE, 3 PRBs are needed to build a sCCE (i.e., 3 sREG). These 3 PRBs can be distributed over the sPDCCH-PRB-set or can be localized as three consecutive PRBs. In FIG. 11, an example of distributed and localized configurations are depicted for 4 sCCEs and 1 OFDM symbol sPDCCH (the unused PRBs shown in FIG. 11 can be further assigned for building other sCCE as well as the possibility to be used for sPDSCH allocation). FIG. 11 refers to the case where the sPDCCH is configured with only 1 OFDM symbol in time (i.e., considering only OS1), For clarity, sCCE0 is indicated as "0", sCCE1 is indicated as "1", sCCE2 is indicated as "2" and sCCE3 is indicated as "3".

The same considerations described above for 1 OFDM symbol sPDCCH can be extended for 2 OFDM symbols sPDCCH. 2 OFDM symbols are suitable for CRS-based sPDCCH transmissions over poor channel conditions or for the short TTI operation within a small frequency region. Likewise, as mentioned, 2 OFDM symbols sPDCCH is more suitable for DMRS-based transmissions.

If three sREG are needed to build an sCCE, there are two mapping options to be considered for 2 OFDM symbol sPDCCH. These options including an example of distributed and localized configurations are depicted for 4 sCCEs and 2 OFDM symbols sPDCCH in FIG. 12 (the unused PRBs shown in FIG. 12 can be further assigned for building other sCCEs as well as the possibility to be used for sPDSCH allocation). For clarity, sCCE0 is indicated as "0", sCCE1 is indicated as "1", sCCE2 is indicated as "2" and sCCE3 is indicated as "3".

In option A (FIG. 12—left), the sREG forming an sCCE are selected in the order: time-first-frequency-second. Thus, it is possible to utilize from the beginning the 2 OFDM symbols available per PRB. However, option A comprises a low frequency diversity of the sREG in a distributed configuration. On the other hand, in option B (FIG. 6—right), the sREG forming an sCCE are selected in the order: frequency-first-time-second. With option B, higher frequency diversity of the sREG can be achieved. For both options, the localized configuration comprises same conditions.

In FIGS. 11 and 12, the Physical Resource Blocks shown are numbered consecutively in a frequency order, and are transmitted at the same time. The symbols (OS1 and OS2) are transmitted at separate times (consecutively). In FIG. 12, "time-first-frequency-second" (option A) means that the sREGs are allocated in order to different times (symbols) in the sPDCCH and the same PRB (i.e., frequency), until no further time allocations (symbols) are available. Then the next allocated PRB (at a different set of frequencies, which may or not be consecutive) is used. In FIG. 12, option B, references to time (symbols) and frequency (PRB) are reversed. It should be noted that even though the PRBs are numbered consecutively in the figures, they are not necessarily physically consecutive PRBs from the available sTTI band. It is just a set of PRBs selected by the network node.

As described above, if 1 sCCE=4 sREG, for 2 OFDM symbol sPDCCH, an sCCE is composed of 2 full PRB, as depicted in FIG. 13, shows an example of distributed and localized configurations for 4 sCCEs (the unused PRBs shown in FIG. 13 can be further assigned for building other sCCEs as well as the possibility to be used for sPDSCH allocation). FIGS. 12 and 13 refer to the case of 2 OFDM symbols sPDCCH (i.e., considering OS1 and OS2). For clarity, sCCE0 is indicated as "0", sCCE1 is indicated as "1", sCCE2 is indicated as "2" and sCCE3 is indicated as "3".

For the case of 3 OFDM symbols, sPDCCH based on DMRS-based transmission for both 2os-sTTI (for the 3 symbols sTTI case) and slot-sTTI (with high reference signal overhead), 1 sCCE composed of 3 sREG can be built with one full PRB along 3 symbols. FIG. 14 shows an example of distributed and localized configurations for 4 sCCEs and 3 OFDM symbols sPDCCH (the unused PRBs shown in FIG. 14 can be further assigned for building other sCCEs as well as the possibility to be used for sPDSCH allocation). FIG. 14 refers to the case of 3 OFDM symbols sPDCCH (i.e., considering OS1, OS2 and OS3). For clarity, sCCE0 is indicated as "0", sCCE1 is indicated as "1", sCCE2 is indicated as "2" and sCCE3 is indicated as "3".

Configurations of the DL control channel for short TTI (sTTI), called sPDCCH (PDCCH for short TTI) herein, are configured over higher layer signaling or pre-defined in the specification. Some of those configurations such as search space and the wireless device's sPDCCH-PRB-set(s) for sTTI operation still need to be defined to be included in the specification.

SUMMARY

The present disclosure advantageously provides a method, network node, and wireless device for supporting a predetermined set of aggregation levels for configuration of a downlink control channel for sTTI to, in some embodiments, limit a number of blind decodes to be performed by a wireless device (WD) and/or, in some embodiments, provide flexibility in a network node for transmission of the downlink control channel for sTTI.

Some embodiments disclosed herein include a method, network node, and wireless device whereby a limited number of aggregation levels and sPDCCH candidates configurable for a wireless device within a 1 ms subframe in sTTI operation. Furthermore, sPDCCH-PRB-set configurations are proposed herein, including definitions to determine the sPDCCH-PRB-set size to be configured for a wireless device or several wireless devices sharing the same PRB-set.

According to one aspect of the disclosure, a method in a network node for supporting a predetermined set of aggregation levels for configuration of a downlink control channel for a short Transmission Time Interval (sTTI) is provided. The method includes determining at least a subset of the predetermined set of aggregation levels to be monitored by a wireless device, WD, in a communication network; and determining a number of downlink control channel candidates for the WD to monitor within each sTTI, the number of downlink control channel candidates based at least in part upon the at least the subset of the predetermined set of aggregation levels.

According to this aspect, in some embodiments, the method further includes assigning the aggregation level and the downlink control channel candidates to the WD. In some embodiments, assigning the aggregation level and the downlink control channel candidates to the WD comprises assigning the aggregation level and the downlink control channel candidates to the WD by higher layers, and optionally, by RRC signaling. In some embodiments, determining the number of downlink control channel candidates for the WD to monitor within each of the one of the slot TTI and the subslot TTI comprises at least determining the number of downlink control channel candidates for the WD to monitor within each of the one of the slot TTI and the subslot TTI based at least on a maximum of six downlink control channel candidates to be monitored within each of the one of the slot TTI and the subslot TTI. References to "each of the one of the slot TTI or subslot TTI" may refer to a slot TTI and/or a subslot TTI, i.e. a short TTI.

In some embodiments, determining the number of downlink control channel candidates for the wireless device to monitor within each of the one of the slot TTI and the subslot TTI comprises determining up to two downlink control channel candidates in high aggregation levels. In some embodiments, a sum of the number of downlink control channel candidates from each aggregation level of the predetermined set of aggregation levels is a maximum of six downlink control channel candidates. In some embodiments, the one of the slot TTI and the subslot TTI is a short TTI. In some embodiments, the downlink control channel is a short physical downlink control channel (sPDCCH). In some embodiments, the aggregation level includes a number of short Control Channel Elements (sCCEs). In some embodiments, the number of sCCEs supports a number of downlink control channel candidates defined per aggregation level of the predetermined set of aggregation levels to be monitored by the WD. In some embodiments, the number of sCCEs is determined based on system bandwidth. In some embodiments, the number of sCCEs is selected to avoid control overhead along available frequency resources per the one of the slot TTI and the subslot TTI. In some embodiments, the method further includes determining a downlink control channel-physical resource block (PRB)-set size for each WD. In some embodiments, determining the PRB-set size for each WD is based at least upon the number of sCCEs, a number of orthogonal frequency-division multiplexing (OFDM) symbols per control channel, and a number of short Resource Element Groups (sREGs) per sCCE. In some embodiments, two PRB-sets are defined to the WD for a demodulated reference signal (DMRS)-based short physical downlink control channel (sPDCCH), a first PRB-set configured as localized and a second PRB-set configured as distributed.

According to another aspect of the disclosure, a network node for supporting a predetermined set of aggregation levels for configuration of a downlink control channel for one of a slot Transmission Time Interval (TTI) and a subslot TTI is provided. The network node includes processing circuitry configured to: determine an aggregation level to be monitored by a wireless device (WD) in a communication network; and determine a number of downlink control channel candidates for the WD to monitor within each of the one of the slot TTI and the subslot TTI, the number of downlink control channel candidates based upon the aggregation level.

According to this aspect, in some embodiments, the processing circuitry is further configured to assign the aggregation level and the downlink control channel candidates to the WD. In some embodiments, the processing circuitry is further configured to assign the aggregation level and the downlink control channel candidates to the WD by higher layers, and optionally, by RRC signaling. In some embodiments, the processing circuitry is further configured to determine the number of downlink control channel candidates for the WD to monitor within each of the one of the slot TTI and the subslot TTI based at least on a maximum of six downlink control channel candidates to be monitored within each of the one of the slot TTI and the subslot TTI. In some embodiments, the processing circuitry is further configured to determine up to two downlink control channel candidates in high aggregation levels. In some embodiments, a sum of the number of downlink control channel candidates from each aggregation level of the predetermined set of aggregation levels to be monitored by the WD is a maximum of six downlink control channel candidates. In some embodiments, the one of the slot TTI and the subslot TTI is a short TTI. In some embodiments, the downlink control channel is a short physical downlink control channel, (sPDCCH). In some embodiments, the aggregation level includes a number of short Control Channel Elements (sCCEs). In some embodiments, the number of sCCEs supports a number of downlink control channel candidates defined per aggregation level of the predetermined set of aggregation levels to be monitored by the WD. In some embodiments, the number of sCCEs is determined based on system bandwidth. In some embodiments, the number of sCCEs is selected to avoid control overhead along available frequency resources per the one of the slot TTI and the subslot TTI. In some embodiments, the processing circuitry is further configured to determine a downlink control channel-physical resource block (PRB)-set size for each WD. In some embodiments, the processing circuitry is further configured to determine the PRB-set size for each WD based at least upon the number of sCCEs, a number of orthogonal frequency-division multiplexing (OFDM) symbols per control channel, and a number of short Resource Element Groups (sREGs) per sCCE. In some embodiments, the processing circuitry is further configured to define to the WD two PRB-sets for a demodulated reference signal (DMRS)-based short physical downlink control channel (sPDCCH), a first PRB-set configured as localized and a second PRB-set configured as distributed.

According to yet another aspect of the disclosure, a method in a wireless device (WD) for supporting a predetermined set of aggregation levels and for implementing at least one aggregation level and at least one downlink control channel candidate for configuration of a downlink control channel for one of a slot Transmission Time Interval (TTI) and a subslot TTI is provided. The method includes receiving, from a network node, an assigned aggregation level to be monitored by the WD in a communication network; and receiving, from the network node, assigned downlink control channel candidates, the network node determining a number of downlink control channel candidates for the WD to monitor within each of the one of the slot TTI and the subslot TTI, the number of downlink control channel candidates based upon the assigned aggregation level.

According to this aspect, in some embodiments, receiving, from the network node, the assigned aggregation level to be monitored by the WD in the communication network comprises receiving, via higher layers, and optionally, via Radio Resource Control, RRC, signaling from the network node, the assigned aggregation level to be monitored by the WD in the communication network. In some embodiments, the method further includes monitoring the assigned aggregation level. In some embodiments, the number of downlink control channel candidates is based at least on a maximum of six downlink control channel candidates to be monitored within each of the one of the slot TTI and the subslot TTI. In some embodiments, a sum of the number of downlink control channel candidates from each aggregation level of the predetermined set of aggregation levels to be monitored by the WD is a maximum of six downlink control channel candidates. In some embodiments, the one of the slot TTI and the subslot TTI is a short TTI. In some embodiments, the downlink control channel is a short physical downlink control channel (sPDCCH). In some embodiments, the aggregation level includes a number of short Control Channel Elements (sCCEs). In some embodiments, the number of sCCEs supports a number of downlink control channel candidates defined per aggregation level of the predetermined set of aggregation levels to be monitored by the WD. In some embodiments, the number of sCCEs is determined based on system bandwidth. In some embodiments, the number of sCCEs is selected to avoid control overhead along available frequency resources per the one of the slot TTI and the subslot TTI.

According to yet another aspect of the disclosure, a wireless device (WD) for supporting a predetermined set of aggregation levels and for implementing at least one aggregation level and at least one downlink control channel candidate for configuration of a downlink control channel for one of a slot Transmission Time Interval (TTI) and a subslot TTI is provided. The WD includes processing circuitry configured to: receive, from a network node, an assigned aggregation level to be monitored by the WD in a communication network; and receive, from the network node, assigned downlink control channel candidates, the network node determining a number of downlink control channel candidates for the WD to monitor within each of the one of the slot TTI and the subslot TTI, the number of downlink control channel candidates based the assigned aggregation level.

According to this aspect, in some embodiments, processing circuitry is further configured to receive, via higher layers, and optionally, via Radio Resource Control (RRC) signaling from the network node, the assigned aggregation level to be monitored by the WD in the communication network. In some embodiments, the processing circuitry is further configured to monitor the assigned aggregation level. In some embodiments, the number of downlink control channel candidates is based at least on a maximum of six downlink control channel candidates to be monitored within each of the one of the slot TTI and the subslot TTI. In some embodiments, the number of downlink control channel candidates is up to two downlink control channel candidates in high aggregation levels. In some embodiments, a sum of the number of downlink control channel candidates from each aggregation level of the predetermined set of aggregation levels to be monitored by the WD is a maximum of six downlink control channel candidates. In some embodiments, the one of the slot TTI and the subslot TTI is a short TTI. In some embodiments, the downlink control channel is a short physical downlink control channel (sPDCCH). In some embodiments, the aggregation level includes a number of short Control Channel Elements (sCCEs). In some embodiments, the number of sCCEs supports a number of downlink control channel candidates defined per aggregation level of the predetermined set of aggregation levels to be monitored by the WD. In some embodiments, the number of sCCEs is determined based on system bandwidth. In some embodiments, the number of sCCEs is selected to avoid control overhead along available frequency resources per the one of the slot TTI and the subslot TTI.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

Figure 12:
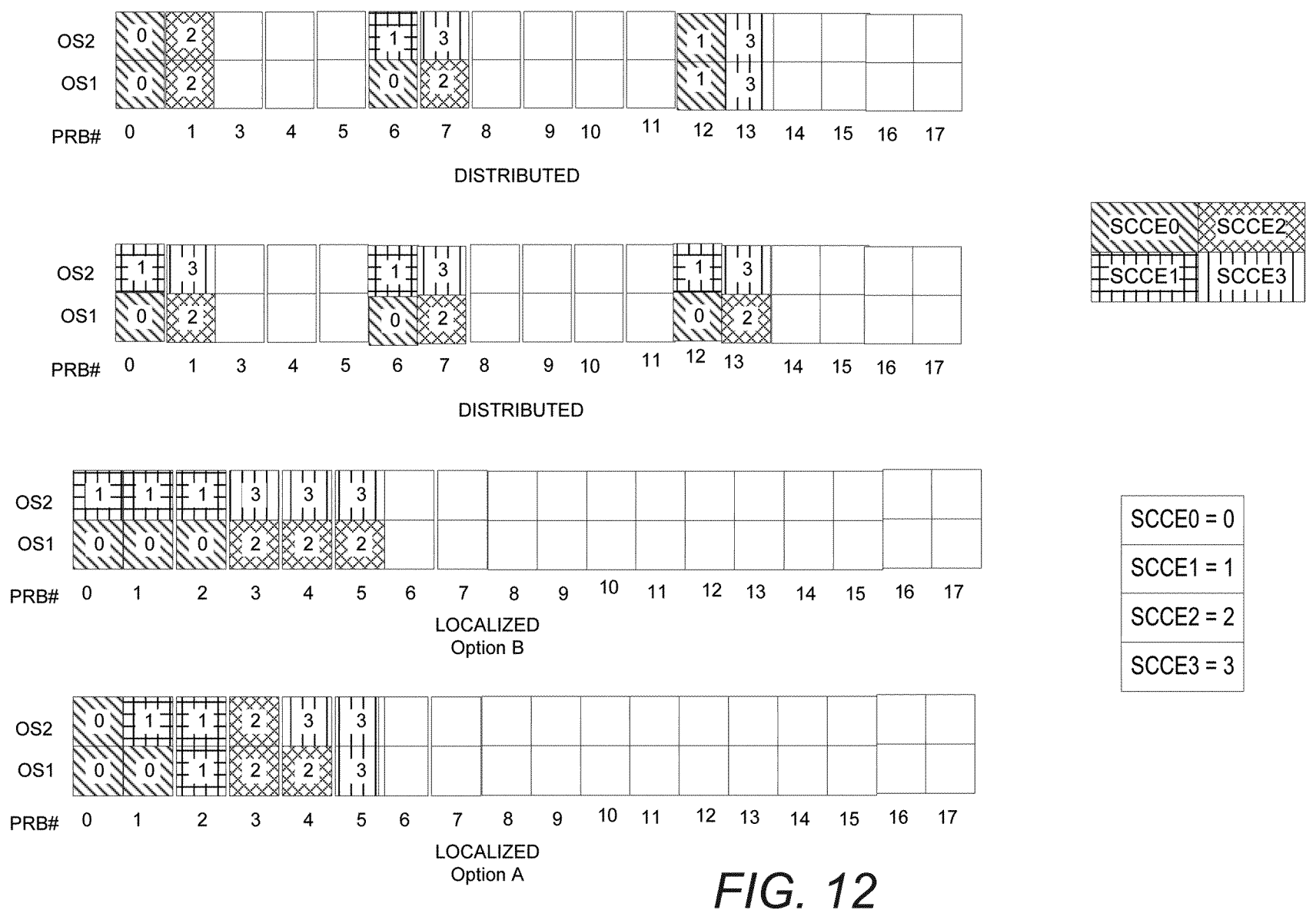

FIG. 12 illustrates distributed and localized configurations for 4 sCCEs composed of 3 sREGs each within a 2os-sPDCCH-PRB-set;

DETAILED DESCRIPTION

Figure 1:
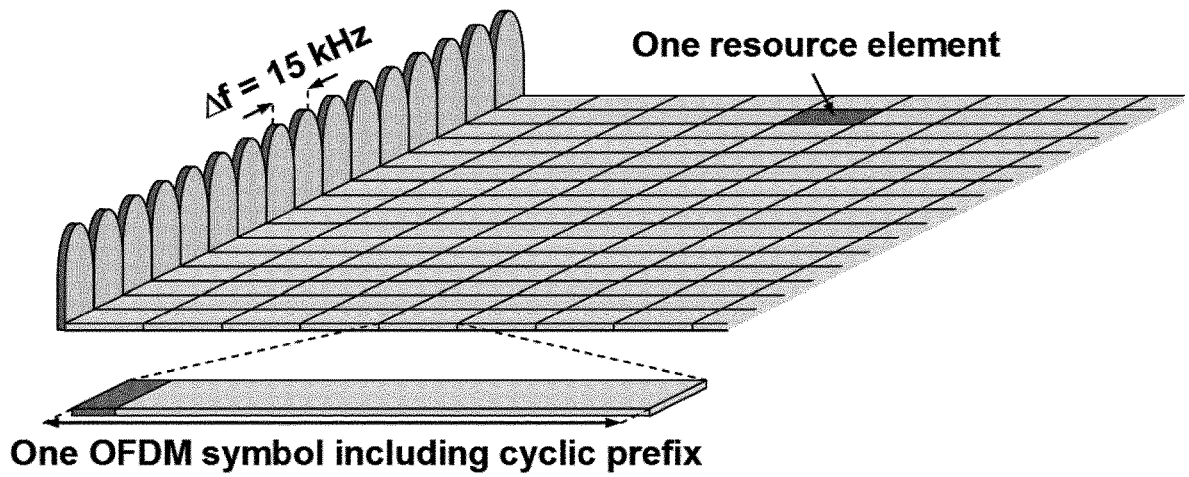
FIG. 1 is a diagram of a time-frequency grid.
Figure 2:
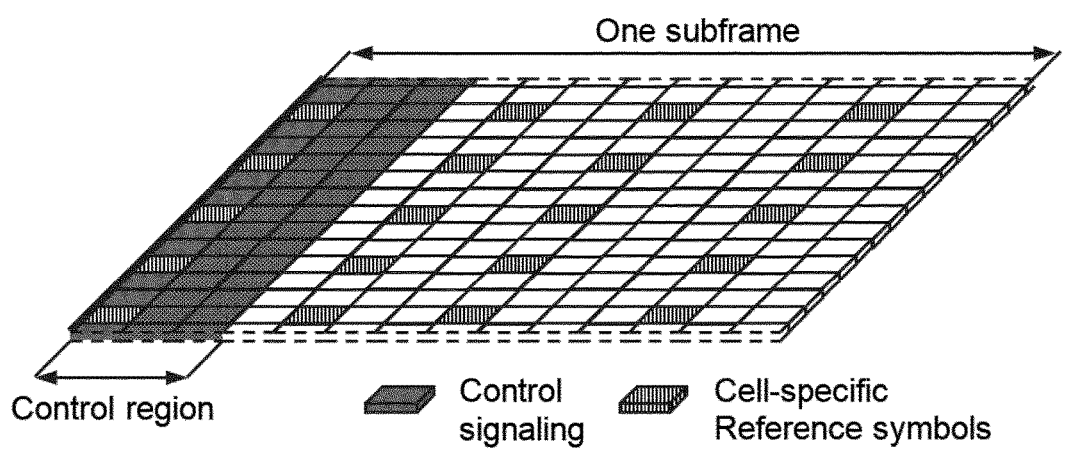
FIG. 2 is a diagram of downlink subframe.
Figure 3:
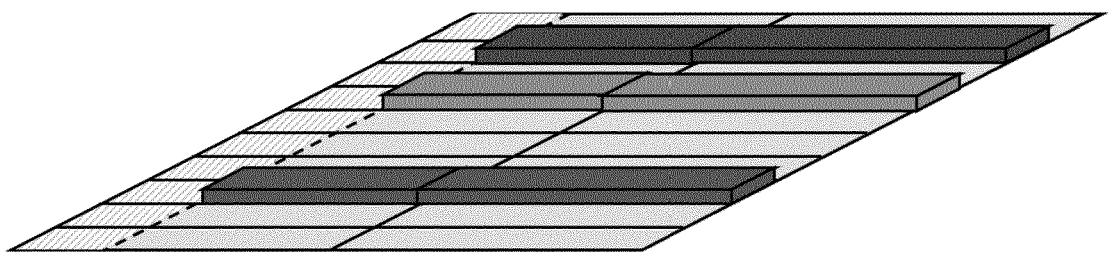
FIG. 3 is a diagram of a downlink subframe showing 10 RB pairs and configuration of three ePDCCH regions.
Figure 4:
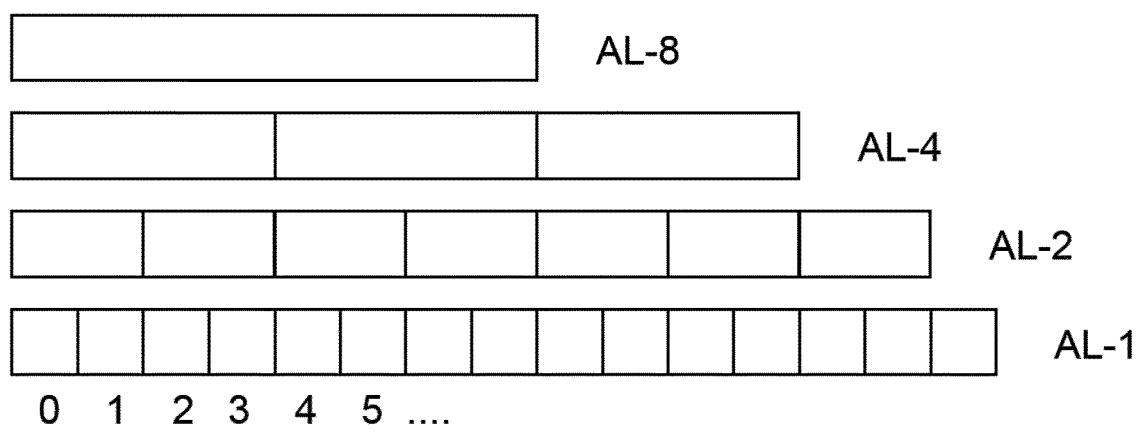
FIG. 4 is a diagram of CCE aggregation.
Figure 5:
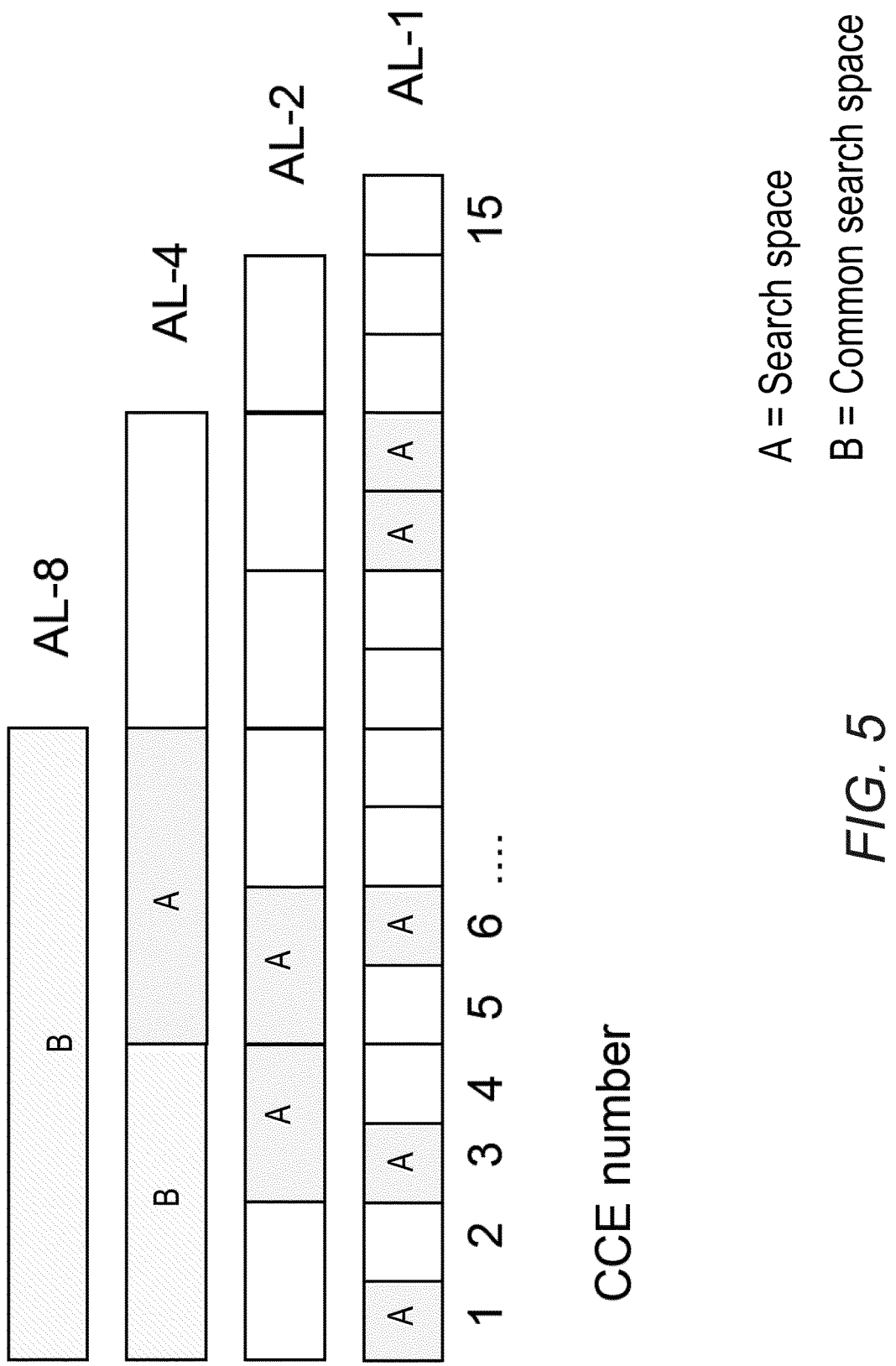
FIG. 5 is a diagram showing a search space to be monitored by a wireless device.
Figure 6:
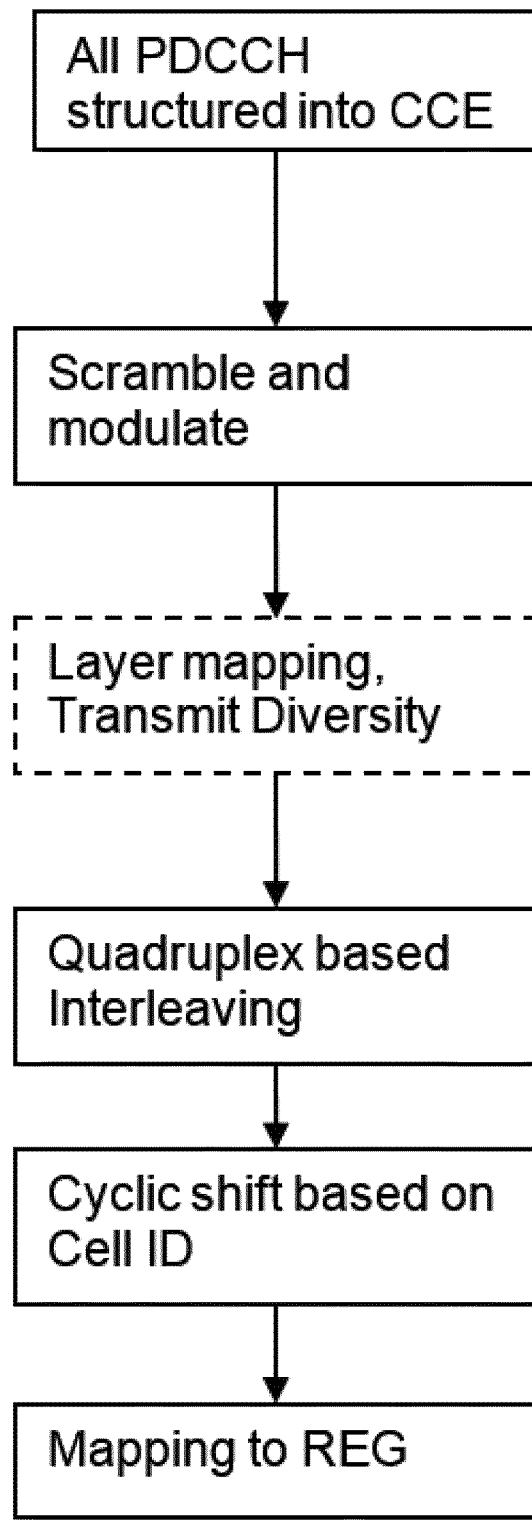
FIG. 6 is a flowchart of processing steps for PDCCH formation.
Figure 7:
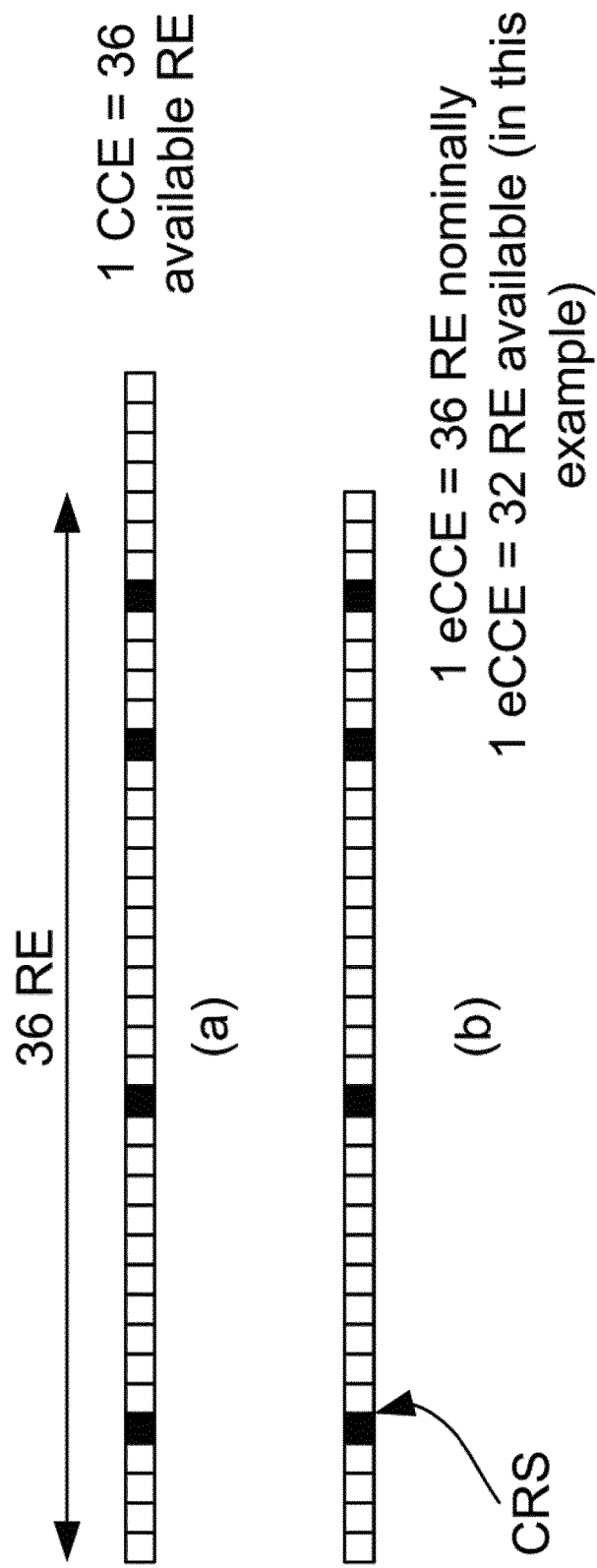
FIG. 7 illustrates differences between a CCE and an eCCE.
Figure 8:
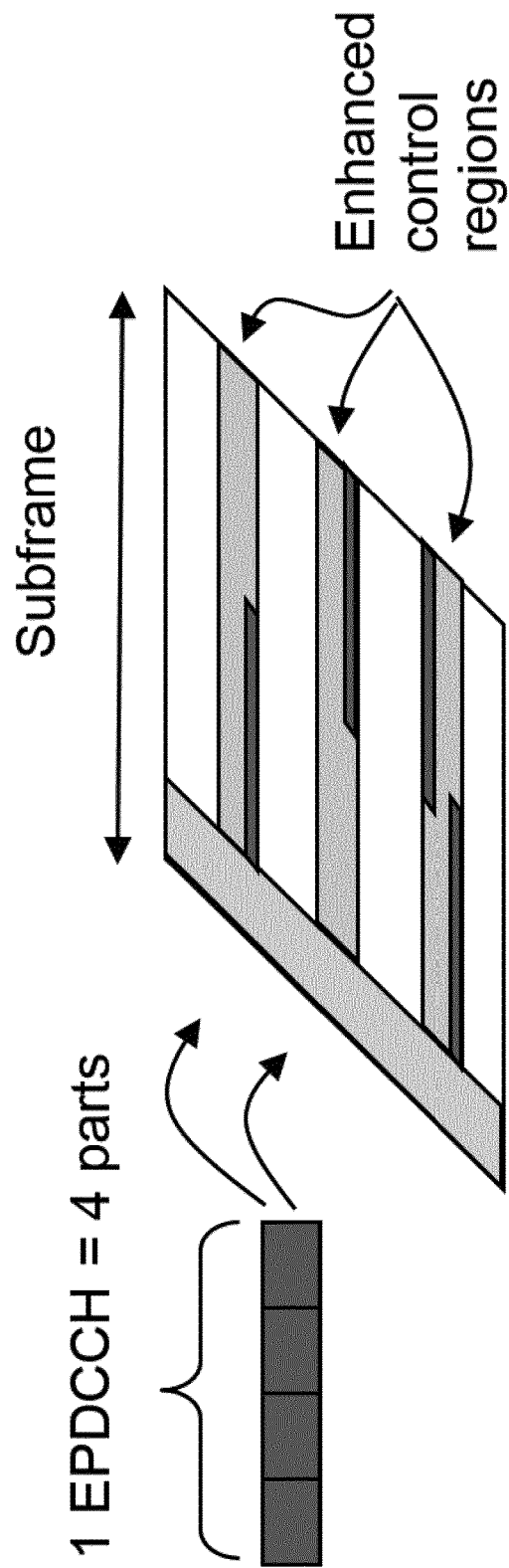
FIG. 8 is a downlink subframe having 4 parts belonging to an ePDCCH.
Figure 9:
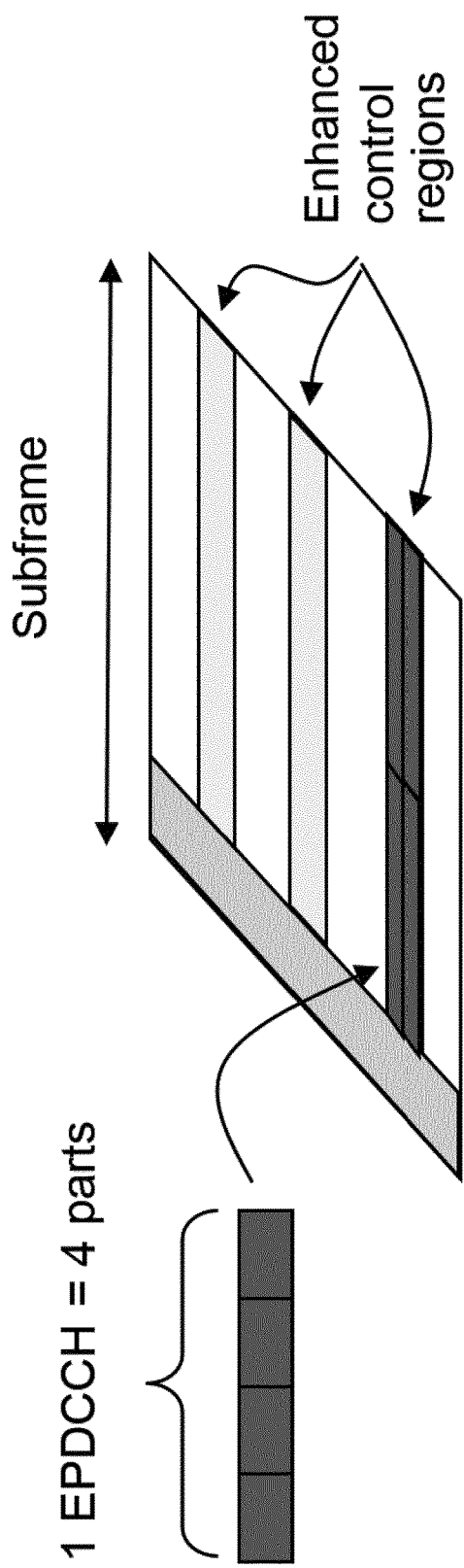
FIG. 9 is a downlink subframe showing a different mapping of 4 eCCEs.
Figure 10:
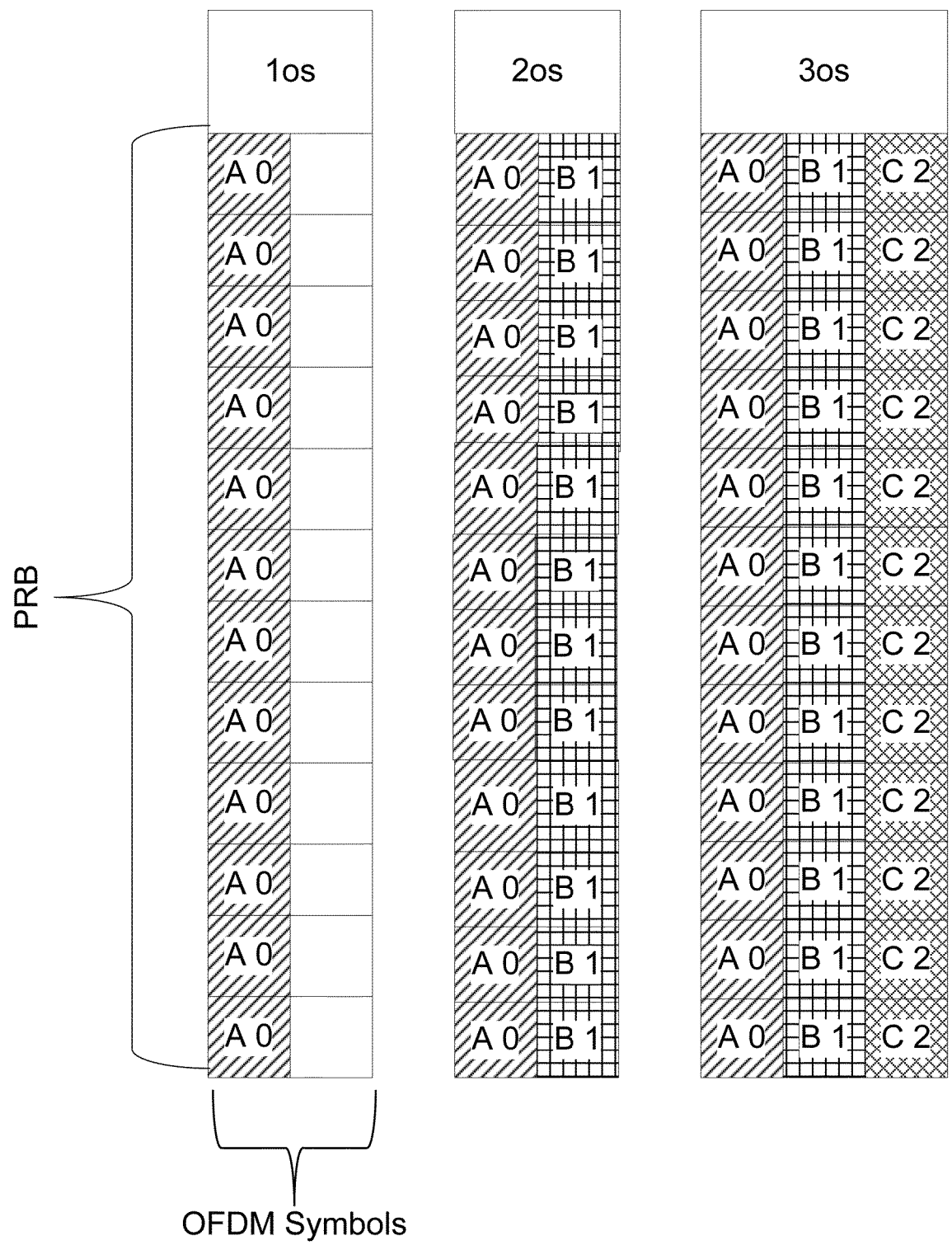
FIG. 10 is an illustration of sREG configuration based on 12 REs within 1 OFDM.
Figure 11:
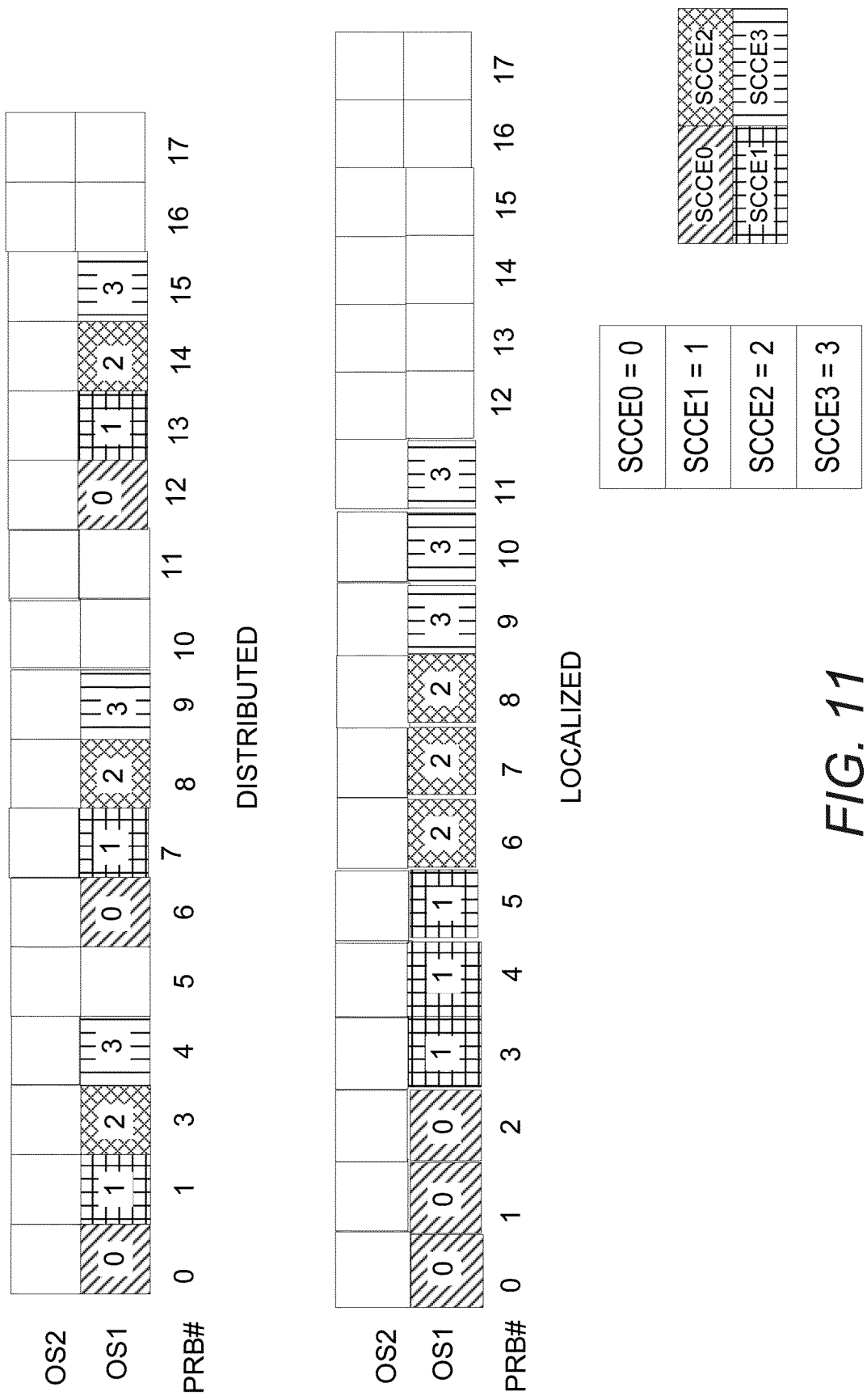
FIG. 11 illustrates distributed and localized configurations for 4 sCCEs.
Figure 13:
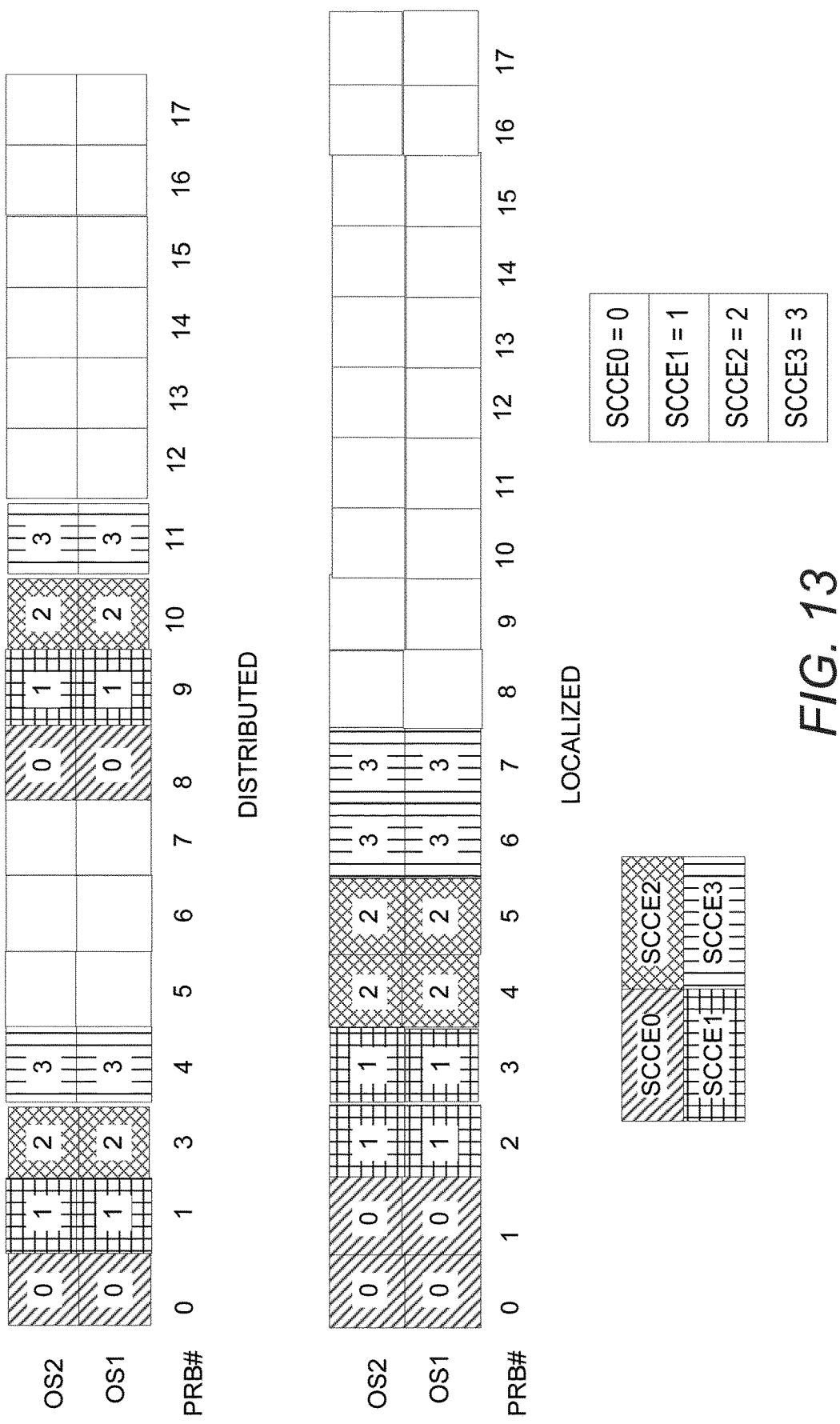
FIG. 13 illustrates distributed and localized configurations for 4 sCCEs composed of 4 sREGs each within a 2os-sPDCCH-PRB set'
Figure 14:
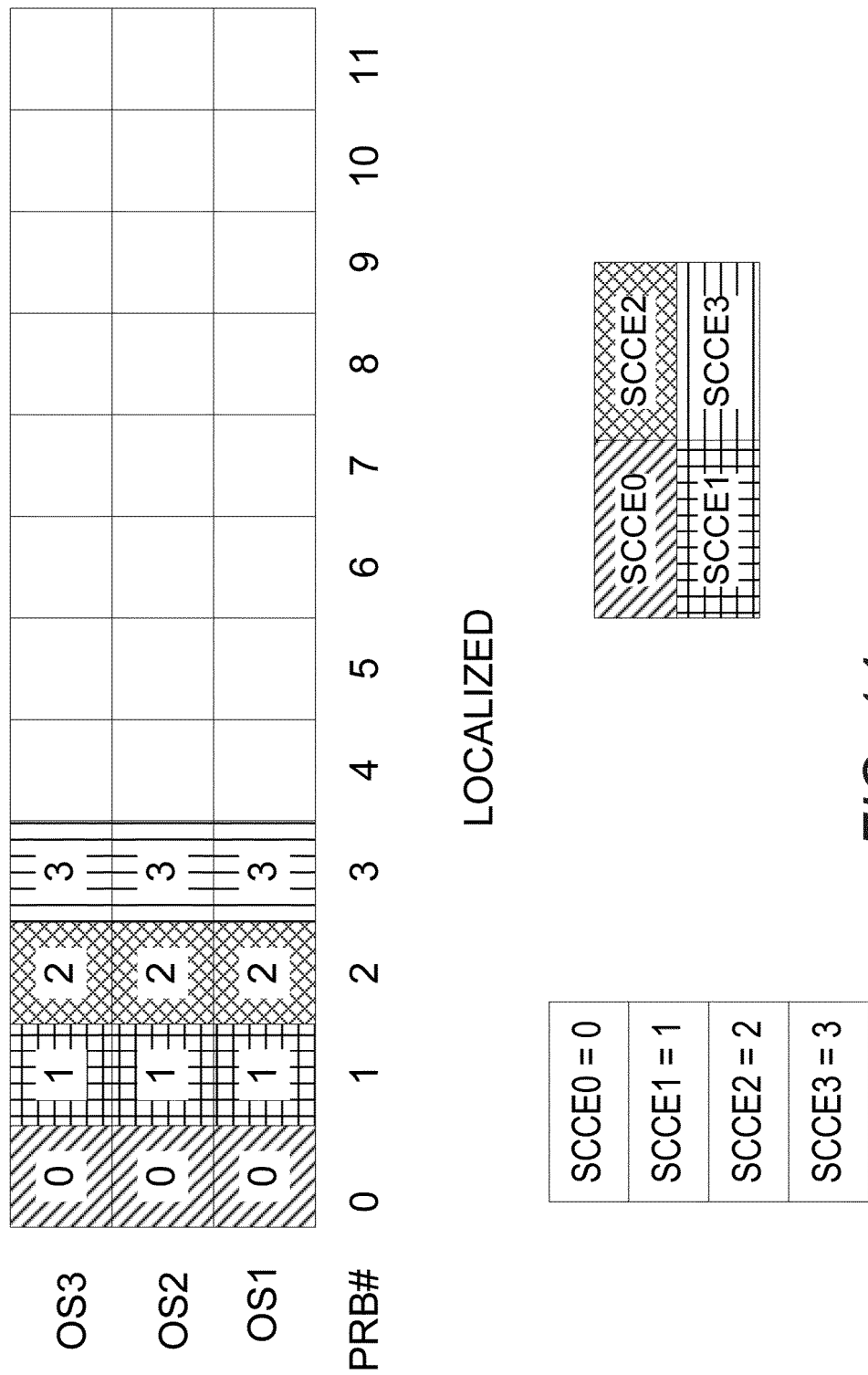
FIG. 14 illustrates a 3-os-sPDCCH configuration with w sCCEs.

Before describing in detail exemplary embodiments, it is noted that the embodiments reside primarily in combinations of apparatus components and processing steps related to defining aggregation levels and sPDCCH candidates per aggregation level to be supported for sTTI operation and defining the sPDCCH-PRB-set size for sTTI operation.

Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

The present disclosure is described within the context of LTE, i.e., E-UTRAN. It should be understood that the problems and solutions described herein are equally applicable to wireless access networks and wireless devices (user-equipment (UE)) implementing other access technologies and standards (e.g. 5G NR). LTE is used as an example technology, and using LTE in the description therefore is particularly useful for understanding the problem and solutions solving the problem.

As used herein, relational terms, such as "first" and "second," "top" and "bottom," and the like, may be used solely to distinguish one entity or element from another entity or element without necessarily requiring or implying any physical or logical relationship or order between such entities or elements.

The embodiments described herein can be used to limit the number of blind decodes to be performed by the wireless devices within 1 ms subframe in order to facilitate wireless device's implementation and capabilities. The proposed sPDCCH-PRB-set configuration is wireless device-specific but it can also be shared between multiple wireless devices. Thus, full flexibility can be given to the network node for the transmission of sPDCCH. Additionally, the sPDCCH-PRB-set size definitions are based on providing high order diversity as well as avoiding excessive control overhead within one sTTI.

Throughout this disclosure, it is assumed that sPDCCH parameters have been pre-configured over higher layer signaling such as RRC for LTE or pre-defined, e.g., in the LTE specifications. A typical sPDCCH parameter is the number of time resources, e.g., OFDM symbols, used for sPDCCH transmission. As an example, for the short TTI (sTTI) operation, the pre-configured or pre-defined number of OFDM symbols (OS) for sPDCCH is 1, 2 or 3 in the following description.

Figure 15:
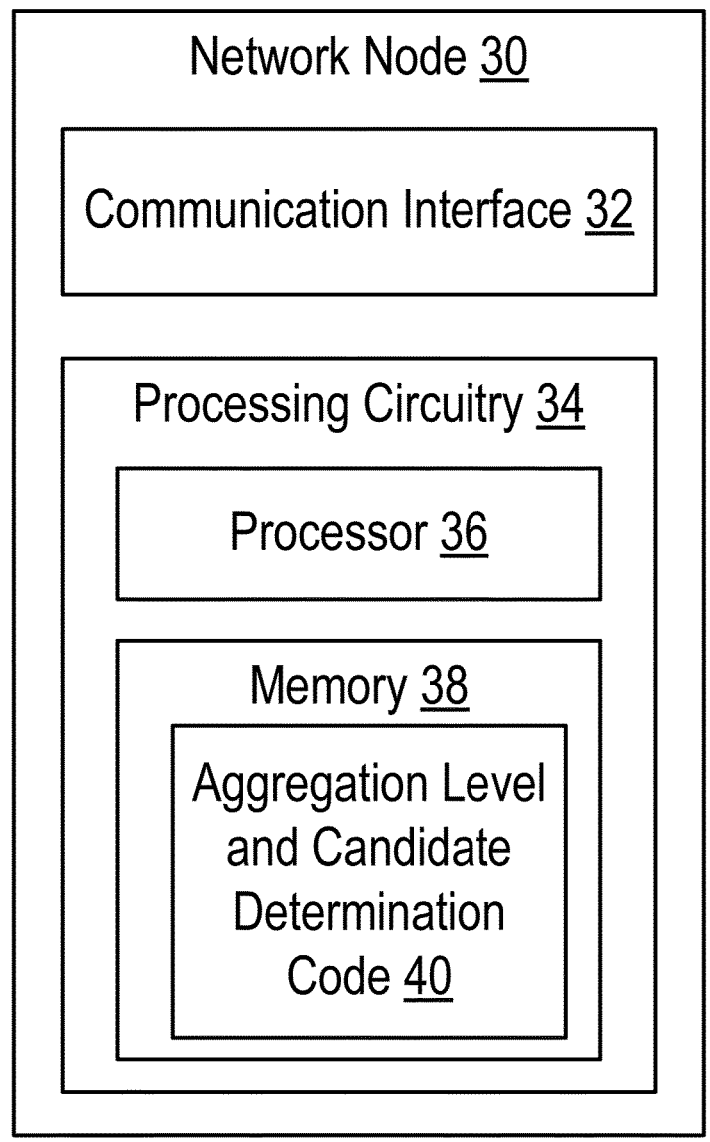
FIG. 15 is a block diagram of a network node for configuration of a downlink control channel for a sTTI, in accordance with the principles of the present disclosure.

Referring now to FIG. 15, the components of an example network node 30 for supporting a predetermined set of aggregation levels for configuration of a downlink control channel for a short Transmission Time Interval (sTTI), are illustrated. In one embodiment, network node 30 includes a communication interface 32, and processing circuitry 34. Processing circuitry 34 includes a processor 36 and a memory 38. Memory 38 may include aggregation level and candidate determination code 40. In some embodiments, the aggregation level and candidate determination code 40 may include instructions for implementing one or more of the techniques described herein, with respect to network node 30. Memory 38 may comprise any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory may be configured to store code executable by control circuitry and/or other data, e.g., data pertaining to communication, e.g., configuration and/or address data of nodes, etc.

Processor 36 is configured to perform all or some of the processes described herein, with respect to network node 30. In addition to a traditional processor and memory and the microcontroller arrangement described above, processing circuitry 34 may include integrated circuitry for processing and/or control, e.g., one or more processors and/or processor cores and/or FPGAs (Field Programmable Gate Array) and/or ASICs (Application Specific Integrated Circuitry).

Processing circuitry 34 may include and/or be connected to and/or be configured for accessing (e.g., writing to and/or reading from) memory 38, which may comprise any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 38 may be configured to store code executable by control circuitry and/or other data, e.g., data pertaining to communication, e.g., configuration and/or calibration of input data, etc. Processing circuitry 34 may be configured to control any of the methods described herein and/or to cause such methods to be performed, e.g., by processor 36. Corresponding instructions may be stored in the memory 38, which may be readable and/or readably connected to the processing circuitry 34. In other words, processing circuitry 34 may include a controller, which may comprise a microprocessor and/or microcontroller and/or FPGA (Field-Programmable Gate Array) device and/or ASIC (Application Specific Integrated Circuit) device. It may be considered that processing circuitry 34 includes or may be connected or connectable to memory, which may be configured to be accessible for reading and/or writing by the controller and/or processing circuitry 34.

Figure 16:
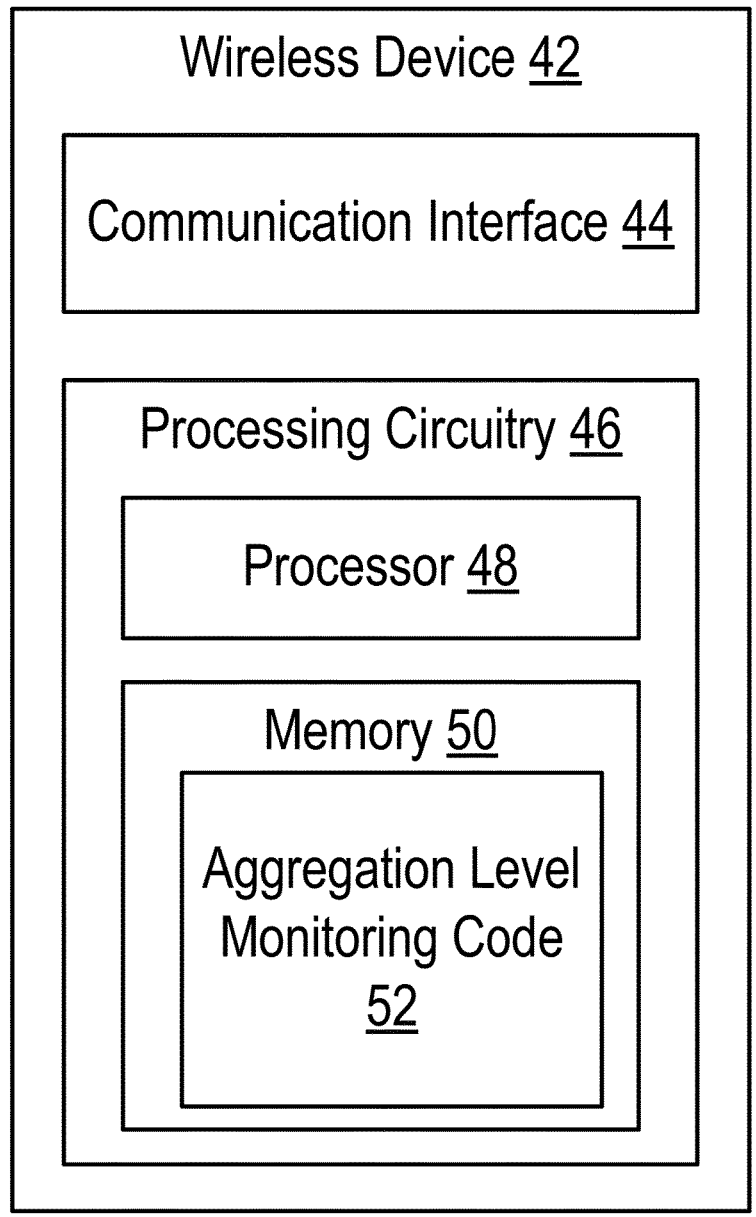
FIG. 16 is a block diagram of a wireless device for implementing a set of aggregation levels and downlink control channel candidates for configuration of a downlink control channel for a sTTI, in accordance with the principles of the present disclosure.

Referring now to FIG. 16, the components of an example wireless device 42 supporting a predetermined set of aggregation levels and for implementing at least one aggregation level and at least one downlink control channel candidates for configuration of a downlink control channel for a short Transmission Time Interval (sTTI), is provided. The wireless device 42 includes a communication interface 44 and processing circuitry 46. Processing circuitry 46 includes a processor 48 and a memory 50. Memory may store aggregation level monitoring code 52. In some embodiments, the aggregation level monitoring code 52 may include instructions for implementing one or more of the techniques described herein, with respect to WD 42. Memory 50 may comprise any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory may be configured to store code executable by control circuitry and/or other data, e.g., data pertaining to communication, e.g., configuration and/or address data of nodes, etc.

Processor 48 is configured to perform all or some of the processes described herein, with respect to wireless device 42. In addition to a traditional processor and memory and the microcontroller arrangement described above, processing circuitry 46 may include integrated circuitry for processing and/or control, e.g., one or more processors and/or processor cores and/or FPGAs (Field Programmable Gate Array) and/or ASICs (Application Specific Integrated Circuitry).

Processing circuitry 46 may include and/or be connected to and/or be configured for accessing (e.g., writing to and/or reading from) memory 50, which may comprise any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 50 may be configured to store code executable by control circuitry and/or other data, e.g., data pertaining to communication, e.g., configuration and/or calibration of input data, etc. Processing circuitry 46 may be configured to control any of the methods described herein and/or to cause such methods to be performed, e.g., by processor 48. Corresponding instructions may be stored in the memory 50, which may be readable and/or readably connected to the processing circuitry 46. In other words, processing circuitry 46 may include a controller, which may comprise a microprocessor and/or microcontroller and/or FPGA (Field-Programmable Gate Array) device and/or ASIC (Application Specific Integrated Circuit) device. It may be considered that processing circuitry 46 includes or may be connected or connectable to memory, which may be configured to be accessible for reading and/or writing by the controller and/or processing circuitry 46.

The term "wireless device" or mobile terminal used herein may refer to any type of wireless device communicating with a network node 30 and/or with another wireless device 42 in a cellular or mobile communication system. Examples of a wireless device 42 are user equipment (UE), target device, device to device (D2D) wireless device, machine type wireless device or wireless device capable of machine to machine (M2M) communication, PDA, tablet, smart phone, laptop embedded equipped (LEE), laptop mounted equipment (LME), USB dongle, etc.

The term "network node" used herein may refer to any kind of radio base station in a radio network which may further comprise any base transceiver station (BTS), base station controller (BSC), radio network controller (RNC), evolved Node B (eNB or eNodeB), NR gNodeB, NR gNB, Node B, multi-standard radio (MSR) radio node such as MSR BS, relay node, donor node controlling relay, radio access point (AP), transmission points, transmission nodes, Remote Radio Unit (RRU) Remote Radio Head (RRH), nodes in distributed antenna system (DAS), etc.

Although embodiments are described herein with reference to certain functions being performed by network node 30, it is understood that the functions can be performed in other network nodes and elements. It is also understood that the functions of the network node 30 can be distributed across network cloud so that other nodes can perform one or more functions or even parts of functions described herein.

Figure 17:
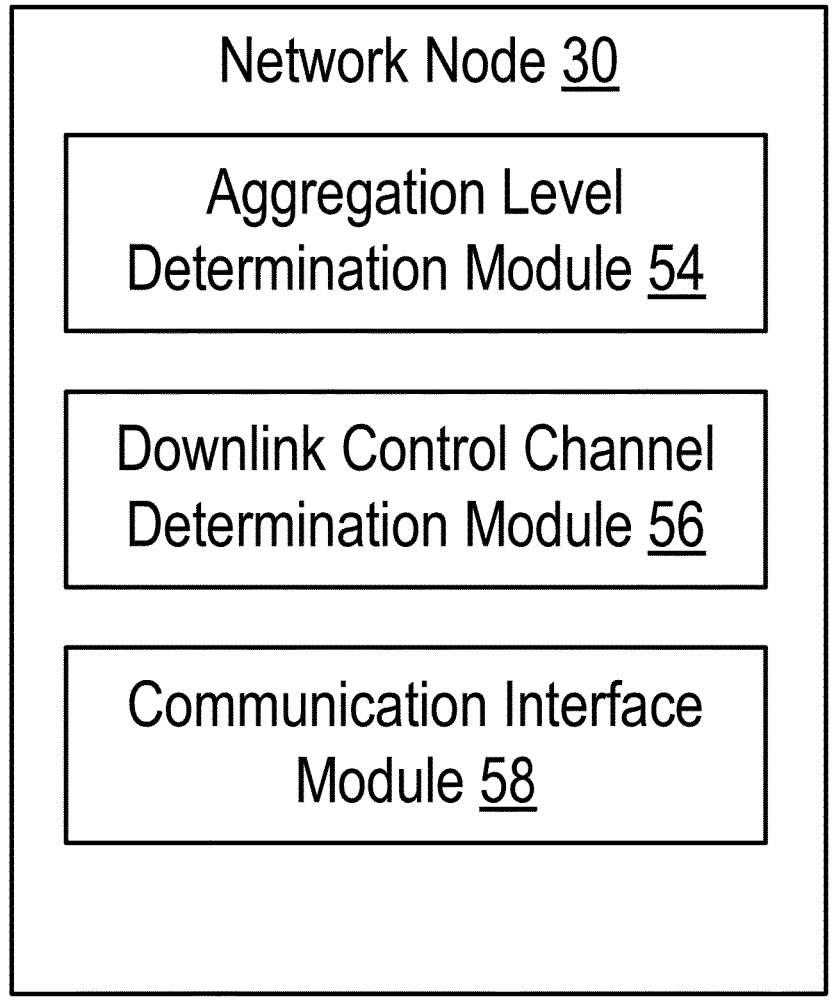
FIG. 17 is an alternate network node for configuration of a downlink control channel for a sTTI, in accordance with the principles of the present disclosure.

Referring to FIG. 17, an alternate embodiment of a network node 30 for configuration of a downlink control channel for a short Transmission Time Interval (sTTI) is shown. In one embodiment, network node 30 includes an aggregation level determination module 54 configured to determine a predetermined set of aggregation levels to be monitored by a wireless device 42 in a communication network, each of the aggregation levels including a number of short Control Channel Elements (sCCEs), a downlink control channel candidate determination module 56 configured to determine a number of downlink control channel candidates for the wireless device 42 to monitor within each sTTI, the number of downlink channel candidates based at least upon the predetermined set of aggregation levels, and a communication interface module 58 configured to assign the set of aggregation levels and the downlink control channel candidates to the wireless device 42.

Figure 18:
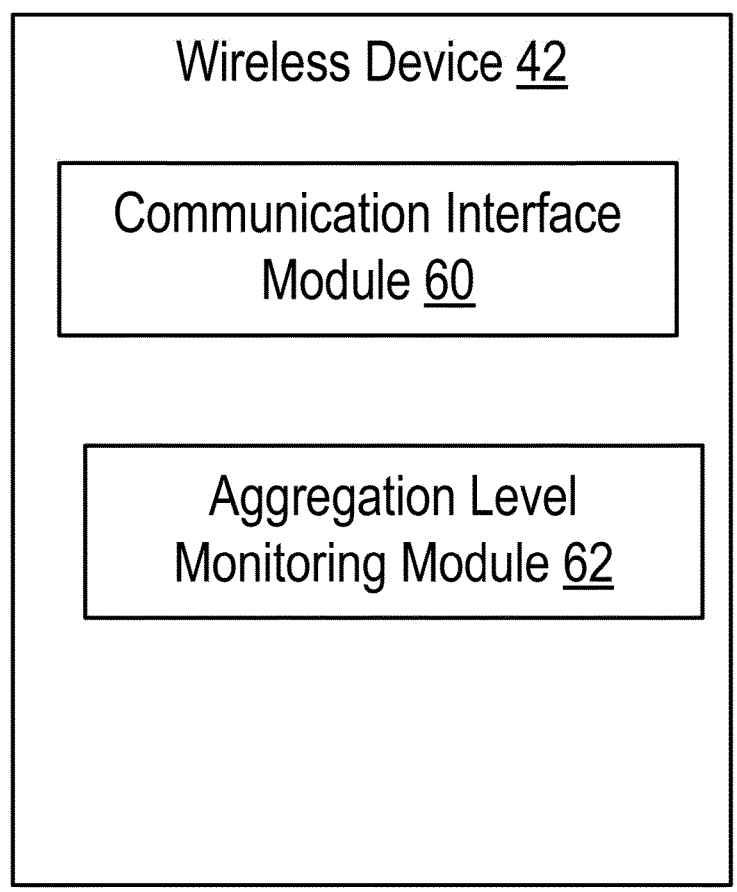
FIG. 18 is an alternate wireless device for implementing a set of aggregation levels and downlink control channel candidates for configuration of a downlink control channel for a sTTI, in accordance with the principles of the present disclosure.

Referring to FIG. 18, an alternate embodiment of a wireless device 42 for implementing a set of aggregation levels and downlink control channel candidates for configuration of a downlink control channel for a short Transmission Time Interval (sTTI), is provided. Wireless device 42 includes a communication interface module 60 configured to receive, from a network node 30, an assigned set of aggregation levels, each of the aggregation levels including a number of short Control Channel Elements (sCCEs) and receive, from the network node 30, assigned downlink control channel candidates, the network node 30 determining the number of downlink control channel candidates for the wireless device 42 to monitor within each sTTI, the number of downlink channel candidates based at least upon the predetermined set of aggregation levels. Wireless device 42 also including an aggregation level monitoring module 62 configured to monitor the assigned set of aggregation levels.

Figure 19:
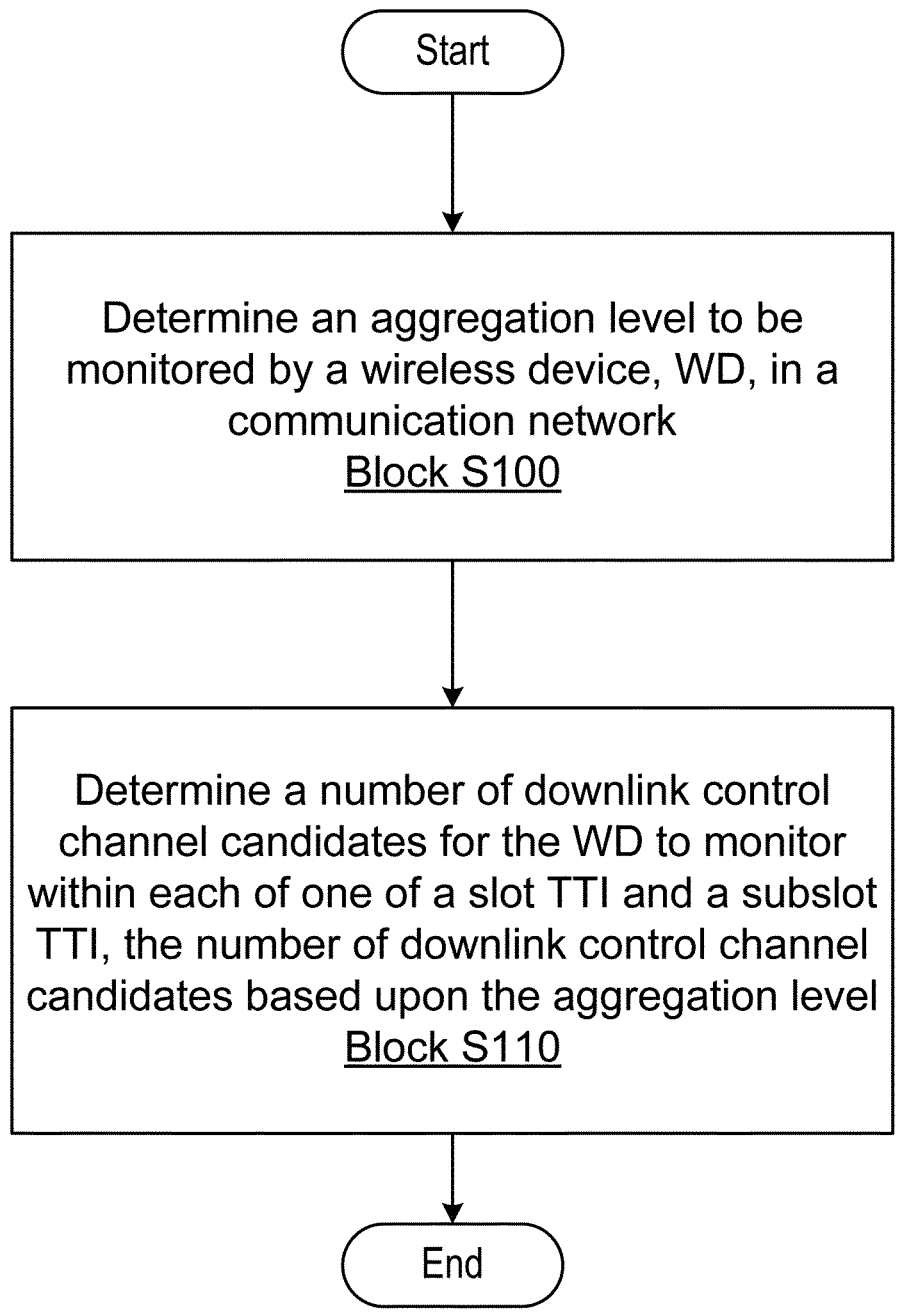
FIG. 19 is a flow diagram of an exemplary process, performed in a network node, for configuration of a downlink control channel for a sTTI, in accordance with the principles of the present disclosure.

Referring to FIG. 19, an exemplary method in a network node 30 for supporting a predetermined set of aggregation levels for configuration of a downlink control channel for a short Transmission Time Interval (sTTI), is provided. In one embodiment, the method includes determining at least a subset of the predetermined set of aggregation levels to be monitored by a wireless device (WD) 42, in a communication network (Block S100); and determining a number of downlink control channel candidates for the WD to monitor within each sTTI, the number of downlink control channel candidates based at least in part upon the at least the subset of the predetermined set of aggregation levels (Block S110).

Figure 20:
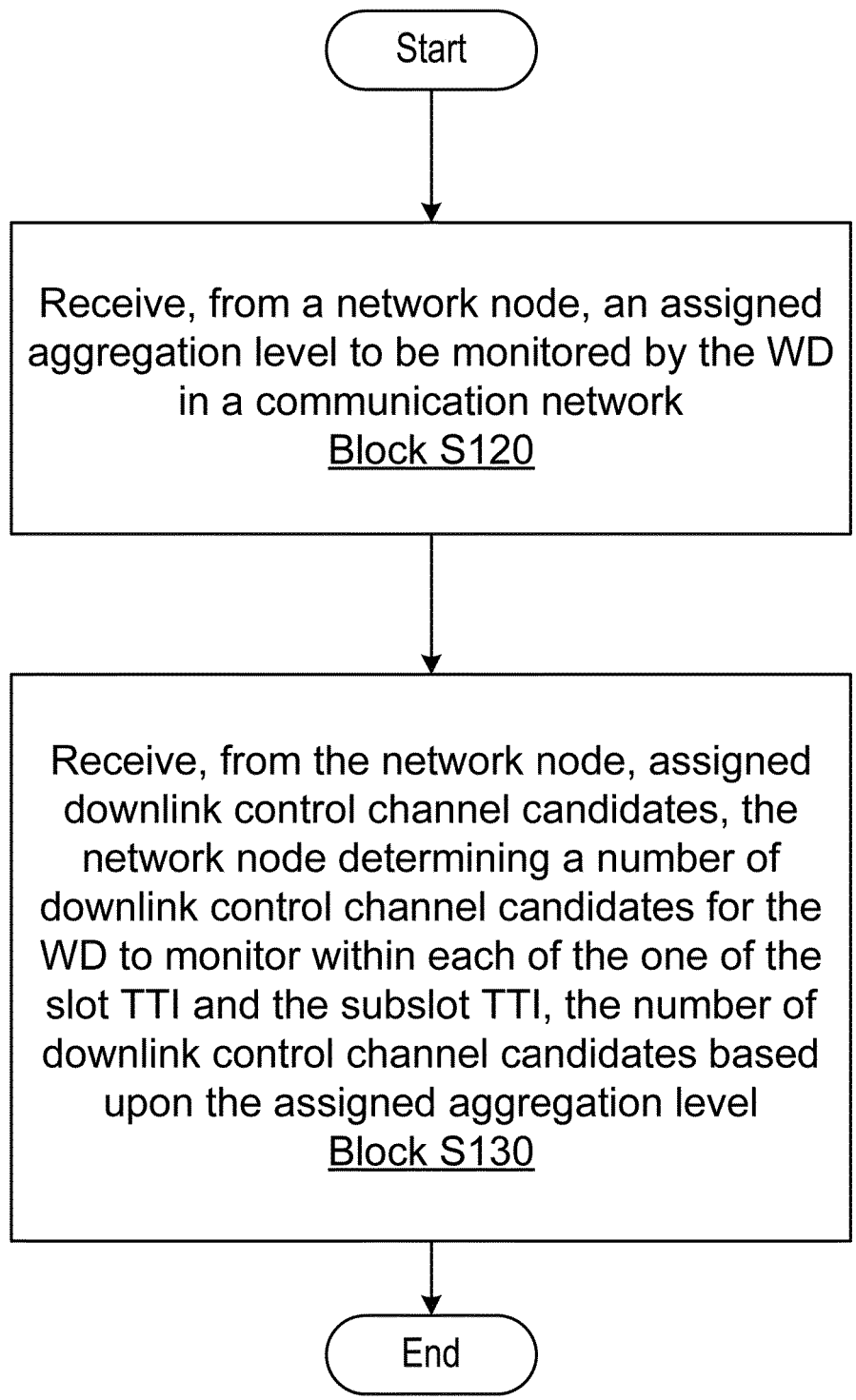
FIG. 20 is a flow diagram of an exemplary process, performed in a wireless device, for implementing a set of aggregation levels and downlink control channel candidates for configuration of a downlink control channel for a sTTI, in accordance with the principles of the present disclosure.

Referring to FIG. 20, a method in a wireless device 42 supporting a predetermined set of aggregation levels and for implementing at least one aggregation level and at least one downlink control channel candidate for configuration of a downlink control channel for a short Transmission Time Interval (sTTI), is provided. The method includes receiving, from a network node 30, an assigned at least a subset of the predetermined set of aggregation levels to be monitored by the WD 42 in a communication network (Block S120); and receiving, from the network node 30, assigned downlink control channel candidates, the network node 30 determining a number of downlink control channel candidates for the WD 42 to monitor within each sTTI, the number of downlink control channel candidates based at least upon the assigned at least the subset of the predetermined set of aggregation levels (Block S130).

Having generally described some embodiments of the present disclosure, a more detailed description of some of the embodiments will now be described below.

Aggregation Levels to be Supported in sTTI Operation

It has been already identified that short TTI can be beneficial mostly at low to medium system loads. It has been noted that sTTI operation may have a flexible sPDCCH region. At low to medium loads, only a few resources may be needed for sPDCCH due to few co-scheduled users and due to high Signal-to-Interference-plus-Noise Ratio (SINR) (low interference). Thus, the sPDCCH can be designed so that the amount of occupied resources is adapted to the number of co-scheduled users (in DL and UL) and their required aggregation level. Therefore, it may be expected that the aggregation level configured to a wireless device (e.g., WD 42) will remain low in sTTI operation. As described above, an aggregation level comprises a number of sCCEs. For instance, aggregation level 1 comprises one sCCE, aggregation level 2 comprises two sCCEs, and aggregation level 4 comprises four sCCEs.

Based on this, in one embodiment of this disclosure, three aggregation levels (AL) {1, 2, 4} for sPDCCH, e.g., up to 4 sCCE per sPDCCH, may be defined to be supported for short TTI operation.

Hence, a wireless device (e.g., WD 42) may be capable of monitoring up to three aggregation levels per sTTI. However, in a further embodiment, a wireless device 42 can be configured by higher layers, such as RRC for LTE, or signaled in a legacy PDCCH (i.e., in the DCI) with the number of candidates to monitor per each configured aggregation level, only to monitor one, two or the three sPDCCH aggregation levels per sTTI. For instance, one low aggregation level, e.g., either 1 or 2, for efficient resource utilization in good channel conditions and one high aggregation level, e.g., 4, for low channel quality. Therefore, the network node 30 may be capable of selecting an appropriate aggregation level set to be configured for each wireless device 42.

sPDCCH Candidates to be Supported in sTTI Operation

For sTTI operation, it has been considered that dynamic switching between short TTI and 1 ms TTI may be supported. This means that a wireless device 42 may search for both 1 ms TTI assignment/grant and sTTI assignment/grant in a subframe. Since the wireless device 42 may monitor additional candidates in the sPDCCH multiple times per subframe, the total number of blind decodes the wireless device 42 needs to perform may increase. Therefore, for short TTI operation, it may be beneficial for the additional number of candidates and attempts of blind decodes (BD) within 1 ms subframe to remain low in order to facilitate the wireless device 42 implementation. For that, in one embodiment of the present disclosure, four sPDCCH candidates are defined per wireless device 42 for each sTTI. This embodiment establishes that low aggregation levels, e.g., AL 1 and AL 2, may include up to three sPDCCH candidates and the high aggregation level, e.g., AL 4, up to two candidates.

As a further embodiment, the candidates per aggregation level to monitor by a wireless device 42 are defined depending on the set of aggregation levels configured to the wireless device 42, as shown in Table 3 below. The definition of the candidates per aggregation level may be based on the required sPDCCH-PRB-set size to be configured. The sPDCCH-PRB-set size is further described below in the present disclosure.

TABLE 3

Candidates to monitor by a wireless device 42 based on its configured aggregation levels. This case considers up to four sPDCCH candidates.
Up to Four sPDCCH Candidates

| Aggregation levels configured to a Wireless Device | Candidates to monitor |
| --- | --- |
| {1} | {3} |
| {2} | {3} |
| {4} | {2} |
| {1, 2} | {2, 2} |
| {1, 4} | {3, 1} |
| {2, 4} | {3, 1} |
| {1, 2, 4} | {2, 1, 1} |

In 2 OFDM symbol sTTIs, there are six sTTIs within 1 ms subframe. If up to four sPDCCH candidates are considered for each sTTI and assuming same DL/UL sDCI sizes, the wireless device 42 would need to monitor additionally 24 candidates within 1 ms subframe for sTTI operation. If the DL/UL sDCI sizes are different, then 48 additional candidates will need to be monitored within 1 ms subframe. However, if the wireless device 42 processing capabilities need to be further reduced within 1 ms subframe, as an enhancement of the previous embodiments, the number of candidates to monitor can be defined as three. In this embodiment, the low aggregation levels, e.g., AL 1 and AL 2, may include up to two candidates and the high aggregation level, e.g., AL 4, one candidate.

As a further embodiment, the candidates per aggregation level to monitor by a wireless device 42 are based on the set of aggregation levels configured to the wireless device 42, as shown in Table 4, below.

TABLE 4

Candidates to monitor by a wireless device 42 based on its configured aggregation levels. This case considers up to three sPDCCH candidates.
Up to Three sPDCCH Candidates

| Aggregation levels configured to a Wireless Device | Candidates to monitor |
| --- | --- |
| {1} | {3} |
| {2} | {3} |
| {4} | {1} |
| {1, 2} | {2, 1} |
| {1, 4} | {2, 1} |
| {2, 4} | {2, 1} |
| {1, 2, 4} | {1, 1, 1} |

Tables 3 and 4 illustrate the feature of limiting the number of sPDCCH candidates to up to 4 candidates. Then, it has been considered that those candidates are split between the aggregation levels which can be configured for a wireless device 42. This means that each aggregation level may be defined with a number of candidates as described in Tables 3 and 4, but, in one embodiment, the sum of all the candidates cannot be more than 4 or 3. For example, in the last option of Table 3, the aggregation levels configured to a wireless device 42 is {1, 2, 4}, where Aggregation Level 1 has two candidates, Aggregation Level 2 has one candidate and Aggregation Level 4 has one candidate, for a total of four candidates for the given aggregation levels.

Tables 3 and 4 above are merely exemplary. In other embodiments, up to six sPDCCH candidates per WD 42 for each sTTI may be considered. For example, low aggregation levels, e.g., 1 and 2, may comprise up to three candidates and the high aggregation level, e.g., 4, up to two candidates (with the possibility of supporting only one AL 4 candidate in some embodiments). For instance, if a WD 42 is configured with aggregation levels {1, 2, 4}, the number of sPDCCH candidates could be defined as {2, 2, 1} to yield a total of 5 candidates per sTTI. In yet another embodiment, for an example of only two aggregation levels configured for the WD 42, e.g. {2, 4}, the number of sPDCCH candidates could be defined as {3, 1} to yield a total of 4 candidates per sTTI. Thus, some embodiments of the present disclosure provide for limiting the number of sPDCCH candidates to a maximum number of candidates (e.g., 3 candidates as shown in Table 4, 4 candidates as shown in Table 3, 6 candidates as discussed above, etc.).

sPDCCH-PRB-Set Configuration for sTTI Operation

As described above, a wireless device 42 can be configured by higher-layer signaling with one or more sPDCCH-PRB-set(s) containing the wireless device's 42 user-specific sTTI search space. The sPDCCH-PRB-set(s) can be configured either localized or distributed. In order to define how many PRB-sets need to be configured to a wireless device 42, in one embodiment of this invention, two PRB-sets are defined to a wireless device 42 for DMRS-based sPDCCH, wherein one set is configured as localized and the second set as distributed. The localized sPDCCH-PRB-set may be used to allocate the sREGs building the same sCCE in a limited band. This arrangement may exploit scheduling and beam-forming gains for DMRS-based sPDCCH when CSI is available at the network node 30. The distributed sPDCCH-PRB-set may be used to provide robust control signaling and fallback when CSI is limited or unavailable. Furthermore, in this embodiment, for CRS-based sPDCCH, it may be defined to configure at least one PRB-set as distributed in order to achieve frequency diversity gains. The sPDCCH-PRB-set configuration choice may be defined by the network node 30 for each wireless device 42.

As a sPDCCH-PRB-set may be composed by a group of PRBs, the network node 30 may have full flexibility in order to define a proper sPDCCH-PRB-set size for each wireless device 42 according to the available system bandwidth. Therefore, as one embodiment, the sPDCCH-PRB-set size may be based on:

- Support of a proper number of sCCEs.
- The number of OFDM symbols per sPDCCH.
- The number of sREG per sCCE.

Hence, the sPDCCH-PRB-set size may be defined as follows:

$$N_{RB} = \frac{N_{sCCE} * \text{nr\_of\_sREG\_per\_sCCE}}{\text{nr\_of\_OFDM\_symbols\_per\_sPDCCH}}$$

Where $N_{RB}$ is the sPDCCH-PRB-set size, $N_{sCCE}$ is the number of sCCEs to be supported (which is further described below), nr_of_sREG_per_sCCE is the number of sREG per sCCE and nr_of_OFDM_symbols_per_sPDCCH is the number of OFDM symbols per sPDCCH. Thus, the definition of the sPDCCH-PRB-set may be defined as a factor of $N_{sCCE}$ as well as the number of OFDM symbols per sPDCCH, and the number of sREGs per sCCE.

From this formulation, one of the main factors is $N_{sCCE}$. Thereby, as a further embodiment, $N_{sCCE}$ may be based on at least:

- Including the number of sCCEs required to support the number of sPDCCH candidates defined per aggregation level per wireless device 42.
- Support, if needed, a limited number of wireless devices 42 with a high aggregation level sPDCCH, e.g., AL 4, in the same sTTI. This for the case that the same sPDCCH-PRB-set may be shared between multiple wireless devices 42.
- System bandwidth.
- The number of sCCEs may be selected in order to avoid excessive control overhead along the available frequency resources per sTTI.

Hence, in one embodiment, each of the possible configurations with regard to the number of OFDM symbols per sPDCCH, e.g., 1OS, 2OS and 3OS, support three different values for N_sCCE: 4 sCCE, 6 sCCE, and 8 sCCE. As described above, N_sCCE=8 sCCE supports, for example, up to two candidates of AL 4 (for the case of defining up to 4 sPDCCH candidates). Also, with 8 sCCEs, the network node 30 may flexibly configure at most two wireless devices 42 sharing the same sPDCCH-PRB-set with an sPDCCH with AL 4 in the same sTTI. N_sCCE=6 sCCEs supports, for example, up to three candidates of AL 2 (for both cases of defining up to 3 or 4 sPDCCH candidates). N_sCCE=4 sCCEs supports, for example, at least one candidate with AL 4.

Based on above formulation, the sPDCCH-PRB-set sizes considering 1os, 2os and 3os sPDCCH as well as 1 sCCE=3 sREG and 1 sCCE=4 sREG for N_sCCE=4, 6 and 8 sCCEs, are defined as one embodiment of this disclosure as described below in Table 5, Table 6 and Table 7, respectively.

TABLE 5 sPDCCH-PRB-set size for the case of $N_{sCCE}$ = 8 sCCE and considering 1os, 2os and 3os sPDCCH as well as 1 sCCE = 3 sREG and 1 sCCE = 4 sREG

| Nr of OFDM symbols per sPDCCH | $N_{sCCE}$ | 1 sCCE = 3 sREG sPDCCH-PRB-set size $N_{RB}$ | 1 sCCE = 4 sREG sPDCCH-PRB-set size $N_{RB}$ |
|---|---|---|---|
| 1 | 8 | 24 | N/A |
| 2 | 8 | 12 | 16 |
| 3 | 8 | 8 | N/A |

TABLE 6 sPDCCH-PRB-set size for the case of $N_{sCCE}$ = 6 sCCE and considering 1os, 2os and 3os sPDCCH as well as 1 sCCE = 3 sREG and 1 sCCE = 4 sREG

| Nr of OFDM symbols per sPDCCH | $N_{sCCE}$ | 1 sCCE = 3 sREG sPDCCH-PRB-set size $N_{RB}$ | 1 sCCE = 4 sREG sPDCCH-PRB-set size $N_{RB}$ |
|---|---|---|---|
| 1 | 6 | 18 | N/A |
| 2 | 6 | 9 | 12 |
| 3 | 6 | 6 | N/A |

TABLE 7 sPDCCH-PRB-set size for the case of $N_{sCCE}$ = 4 sCCE and considering 1os, 2os and 3os sPDCCH as well as 1 sCCE = 3 sREG and 1 sCCE = 4 sREG

| Nr of OFDM symbols per sPDCCH | $N_{sCCE}$ | 1 sCCE = 3 sREG sPDCCH-PRB-set size $N_{RB}$ | 1 sCCE = 4 sREG sPDCCH-PRB-set size $N_{RB}$ |
|---|---|---|---|
| 1 | 4 | 12 | N/A |
| 2 | 4 | 6 | 8 |
| 3 | 4 | 4 | N/A |

As observed, $N_{sCCE}$=8 sCCEs may represent, however, a high sPDCCH overhead, for example, for the case of 1os-sPDCCH and a low system bandwidth, e.g., 5 MHz. Therefore, as one additional embodiment, the network node 30 may carefully configure the sPDCCH-PRB-set size based on the available system bandwidth.

An LTE subframe lasting 1 ms contains 14 OFDM symbols for normal CP. A New Radio (NR) subframe has a fixed duration of 1 ms and may therefore contain a different number of OFDM symbols for different subcarrier spacings. An LTE slot corresponds to 7 OFDM symbols for normal CP. An NR slot corresponds to 7 or 14 OFDM symbols; at 15 kHz subcarrier spacing, a slot with 7 OFDM symbols occupies 0.5 ms. Concerning NR terminology, reference can be made to 3GPP TR 38.802 v14.0.0 and later versions.

References herein to a short TTI may alternatively be considered as a subslot, or a mini-slot according to NR terminology. The mini-slot may have a length of 1 symbol, 2 symbols, 3 or more symbols, or a length of between 1 symbol and a NR slot length minus 1 symbol. The short TTI (or subslot) may have a length of 1 symbol, 2 symbols, 3 or more symbols, an LTE slot length (7 symbols) or a length of between 1 symbol and a LTE subframe length minus 1 symbol. The short TTI, subslot or mini-slot may be considered as having a length less than 1 ms or less than 0.5 ms.

Thus, as described herein, in one embodiment, there are three aggregation levels for sTTI operation. A wireless device 42 may support these three aggregation levels but it can be configured by higher layer, e.g., RRC, to monitor only a set of them.

In one embodiment, the present disclosure defines a limited number of candidates for sPDCCH in sTTI operation, with the definition of the number of candidates per Aggregation Level being dependent on the configured set, as shown in Tables 3 and 4.

In one embodiment, the present disclosure provides sPDCCH-PRB-set configuration including:

- two PRB-sets are defined to a wireless device 42 for DMRS-based sPDCCH, wherein one set may be configured as localized and the second set as distributed;
- for CRS-based sPDCCH, the present disclosure may be defined to configure at least one PRB-set as distributed; and
- the sPDCCH-PRB-set size may be based on three factors, i.e., a factor of N_sCCE, the number of OFDM symbols per sPDCCH, and the number of sREG per sCCE.

In one embodiment, a method in a network node 30 is provided for supporting a predetermined set of aggregation levels for configuration of a downlink control channel for one of a slot Transmission Time Interval (TTI) and a subslot TTI. The method includes determining an aggregation level to be monitored by a wireless device, WD 42, in a communication network (S100); and determining a number of downlink control channel candidates for the WD 42 to monitor within each of the one of the slot TTI and the subslot TTI, the number of downlink control channel candidates based upon the aggregation level (S110). References to one of the slot TTI and subslot TTI, or references to each of the one of the slot TTI and subslot TTI, may refer to use in a slot TTI and/or a subslot TTI, i.e. either one or both of a slot and subslot TTI, i.e. a short TTI. Aspects of the disclosure are applicable to one or both of the slot TTI and subslot TTI (or mini-slot), i.e. in a transmission using a short TTI length. In one embodiment, the method further includes assigning the aggregation level and the downlink control channel candidates to the WD 42. In some embodiments, assigning the aggregation level and the downlink control channel candidates to the WD 42 comprises assigning the aggregation level and the downlink control channel candidates to the WD 42 by higher layers, and optionally, by RRC signaling. In some embodiments, determining the number of downlink control channel candidates for the WD 42 to monitor within each of the one of the slot TTI and the subslot TTI comprises at least determining the number of downlink control channel candidates for the WD 42 to monitor within each of the one of the slot TTI and the subslot TTI based at least on a maximum of six downlink control channel candidates to be monitored within each of the one of the slot TTI and the subslot TTI. In some embodiments, determining the number of downlink control channel candidates for the wireless device to monitor within each of the one of the slot TTI and the subslot TTI comprises determining up to two downlink control channel candidates in high aggregation levels. In some embodiments, a sum of the number of downlink control channel candidates from each aggregation level of the predetermined set of aggregation levels to be monitored by the WD 42 is a maximum of six downlink control channel candidates. In some embodiments, the one of the slot TTI and the subslot TTI is a short TTI. In some embodiments, the downlink control channel is a short physical downlink control channel (sPDCCH). In some embodiments, each aggregation level includes a number of short Control Channel Elements (sCCEs). In some embodiments, the number of sCCEs supports a number of downlink control channel candidates defined per aggregation level of the predetermined set of aggregation levels to be monitored by the WD 42. In some embodiments, the number of sCCEs is determined based on system bandwidth. In some embodiments, the number of sCCEs is selected to avoid control overhead along available frequency resources per the one of the slot TTI and the subslot TTI. In some embodiments, the method further includes determining a downlink control channel-physical resource block, PRB,-set size for each WD 42. In some embodiments, determining the PRB-set size for each WD 42 is based at least upon the number of sCCEs, a number of orthogonal frequency-division multiplexing, OFDM, symbols per control channel, and a number of short Resource Element Groups (sREGs) per sCCE. In some embodiments, two PRB-sets are defined to the WD 42 for a demodulated reference signal (DMRS)-based short physical downlink control channel (sPDCCH), a first PRB-set configured as localized and a second PRB-set configured as distributed.

In another embodiment, a network node 30 is provided for supporting a predetermined set of aggregation levels for configuration of a downlink control channel for one of a slot Transmission Time Interval (TTI) and a subslot TTI. The network node 30 includes processing circuitry 34 configured to: determine an aggregation level to be monitored by a wireless device, WD 42, in a communication network; and determine a number of downlink control channel candidates for the WD 42 to monitor within each of the one of the slot TTI and the subslot TTI, the number of downlink control channel candidates based upon the aggregation level. In some embodiments, the processing circuitry 34 is further configured to assign the aggregation level and the downlink control channel candidates to the WD 42. In some embodiments, the processing circuitry 34 is further configured to assign the aggregation level and the downlink control channel candidates to the WD 42 by higher layers, and optionally, RRC signaling. In some embodiments, the processing circuitry 34 is further configured to determine the number of downlink control channel candidates for the WD 42 to monitor within each of the one of the slot TTI and the subslot TTI based at least on a maximum of six downlink control channel candidates to be monitored within each of the one of the slot TTI and the subslot TTI. In some embodiments, the processing circuitry 34 is further configured to determine up to two downlink control channel candidates in high aggregation levels. In some embodiments, a sum of the number of downlink control channel candidates from each aggregation level of the predetermined set of aggregation levels is a maximum of six downlink control channel candidates. In some embodiments, the one of the slot TTI and the subslot TTI is a short TTI. In some embodiments, the downlink control channel is a short physical downlink control channel (sPDCCH). In some embodiments, the aggregation level includes a number of short Control Channel Elements (sCCEs). In some embodiments, the number of sCCEs supports a number of downlink control channel candidates defined per aggregation level of the predetermined set of aggregation levels to be monitored by the WD 42. In some embodiments, the number of sCCEs is determined based on system bandwidth. In some embodiments, the number of sCCEs is selected to avoid control overhead along available frequency resources per the one of the slot TTI and the subslot TTI. In some embodiments, the processing circuitry 34 is further configured to determine a downlink control channel-physical resource block, PRB,-set size for each WD 42. In some embodiments, the processing circuitry 34 is further configured to determine the PRB-set size for each WD 42 based at least upon the number of sCCEs, a number of orthogonal frequency-division multiplexing, OFDM, symbols per control channel, and a number of short Resource Element Groups (sREGs) per sCCE. In some embodiments, the processing circuitry 34 is further configured to define to the WD 42 two PRB-sets for a demodulated reference signal (DMRS)-based short physical downlink control channel (sPDCCH), a first PRB-set configured as localized and a second PRB-set configured as distributed.

In another embodiment, a method in a wireless device, WD 42 is provided for supporting a predetermined set of aggregation levels and for implementing at least one aggregation level and at least one downlink control channel candidate for configuration of a downlink control channel for one of a slot Transmission Time Interval (TTI) and a subslot TTI. The method includes receiving, from a network node 30, an assigned aggregation level to be monitored by the WD 42 in a communication network (S120); and receiving, from the network node 30, assigned downlink control channel candidates, the network node 30 determining a number of downlink control channel candidates for the WD 42 to monitor within each of the one of the slot TTI and the subslot TTI, the number of downlink control channel candidates based upon the assigned aggregation level (S130). In some embodiments, the method receiving, from the network node 30, the assigned aggregation level to be monitored by the WD 42 in the communication network comprises receiving, via higher layers, and optionally, Radio Resource Control (RRC) signaling from the network node 30, the assigned at aggregation level to be monitored by the WD 42 in the communication network. In some embodiments, the method further includes monitoring the assigned aggregation level. In some embodiments, the number of downlink control channel candidates is based at least on a maximum of six downlink control channel candidates to be monitored within each of the one of the slot TTI and the subslot TTI. In some embodiments, the number of downlink control channel candidates is up to two downlink control channel candidates in high aggregation levels. In some embodiments, a sum of the number of downlink control channel candidates from each aggregation level of the predetermined set of aggregation levels to be monitored by the WD 42 is a maximum of six downlink control channel candidates. In some embodiments, the one of the slot TTI and the subslot TTI is a short TTI. In some embodiments, the downlink control channel is a short physical downlink control channel (sPDCCH). In some embodiments, the aggregation level includes a number of short Control Channel Elements (sCCEs). In some embodiments, the number of sCCEs supports a number of downlink control channel candidates defined per aggregation level of the predetermined set of aggregation levels to be monitored by the WD 42. In some embodiments, the number of sCCEs is determined based on system bandwidth. In some embodiments, the number of sCCEs is selected to avoid control overhead along available frequency resources per the one of the slot TTI and the subslot TTI.

In yet another embodiment, a wireless device (WD) 42 is provided for supporting a predetermined set of aggregation levels and for implementing at least one aggregation level and at least one downlink control channel candidate for configuration of a downlink control channel for one of a slot Transmission Time Interval (TTI) and a subslot TTI. The WD 42 includes processing circuitry 46 configured to: receive, from a network node 30, an assigned aggregation level to be monitored by the WD 42 in a communication network; an receive, from the network node 30, assigned downlink control channel candidates, the network node 30 determining a number of downlink control channel candidates for the WD 42 to monitor within each of the one of the slot TTI and the subslot TTI, the number of downlink control channel candidates based upon the assigned aggregation level. In some embodiments, the processing circuitry 46 is further configured to receive, via higher layers, and optionally, Radio Resource Control (RRC) signaling from the network node 30, the assigned aggregation level to be monitored by the WD 42 in the communication network. In some embodiments, the processing circuitry 46 is further configured to monitor the assigned aggregation level. In some embodiments, the number of downlink control channel candidates is based at least on a maximum of six downlink control channel candidates to be monitored within each of the one of the slot TTI and the subslot TTI. In some embodiments, the number of downlink control channel candidates is up to two downlink control channel candidates in high aggregation levels. In some embodiments, a sum of the number of downlink control channel candidates from each aggregation level of the predetermined set of aggregation levels is a maximum of six downlink control channel candidates. In some embodiments, the one of the slot TTI and the subslot TTI is a short TTI. In some embodiments, the downlink control channel is a short physical downlink control channel (sPDCCH). In some embodiments, the aggregation level includes a number of short Control Channel Elements (sCCEs). In some embodiments, the number of sCCEs supports a number of downlink control channel candidates defined per aggregation level of the predetermined set of aggregation levels to be monitored by the WD 42. In some embodiments, the number of sCCEs is determined based on system bandwidth. In some embodiments, the number of sCCEs is selected to avoid control overhead along available frequency resources per sTTI.

Some further embodiments may include multiplexing of sPDCCH for different WDs 42 within the same search space region for sTTI.

Yet some additional embodiments of the present disclosure may include limiting blind decodes on PDCCH. Since PDCCH can be used to transmit sDCI and dynamic switching between short and 1 ms TTI are supported, a WD 42 may have to search for both 1 ms DCI and sDCI in PDCCH in very subframe. Thus, the total number of blind decodes in PDCCH may increase. One exemplary method to limit the number of blind decodes may be to target a common format for sTTI and 1 ms TTI. Another exemplary method may be to define a search space for sDCI sent on PDCCH as a subset of the search space for 1 ms TTI DCI.

Yet other embodiments may include limiting blind decodes on sPDCCH according to additional techniques. For example, uplink grants and downlink assignments in the DCI may have slightly different fields, e.g., there may be dedicated bits in the DL while having no such dedicated bits in the UL. While uplink grants and downlink allocations might have different amounts of bits in the DCIs, these formats may be blindly decoded on the same sCCEs. Thus, in order to limit blind decodes, a design for DCI formats may be configured to be the same size for all grants and a bit field may indicate if the DCI is an uplink grant or downlink assignment. Such approach may be considered similar to the flag for format 0/format 1A differentiation. In further embodiments, padding bits may be used in addition to indicating bits, in case the number of required bits is different for uplink grants and downlink assignments. In one embodiment, a single size can be defined for both DL and UL sDCI in order to limit the number of blind decodes for the WD 42.

Figure 21A:
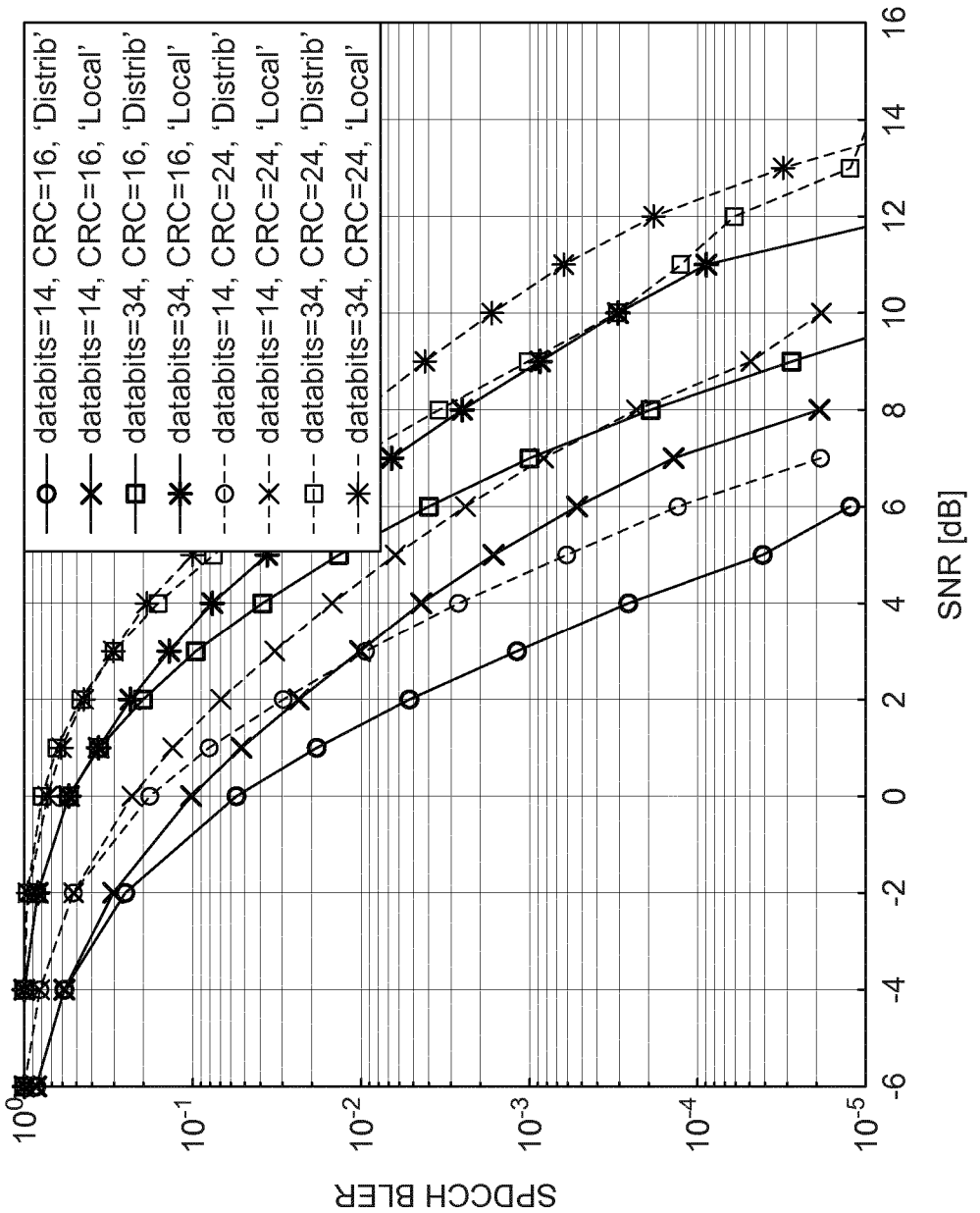
FIGS. 21A-B illustrate link performance for different CRC lengths for an Extended Vehicular A (EVA) channel and an Extended Typical Urban (ETU) channel, respectively.
Figure 21B:
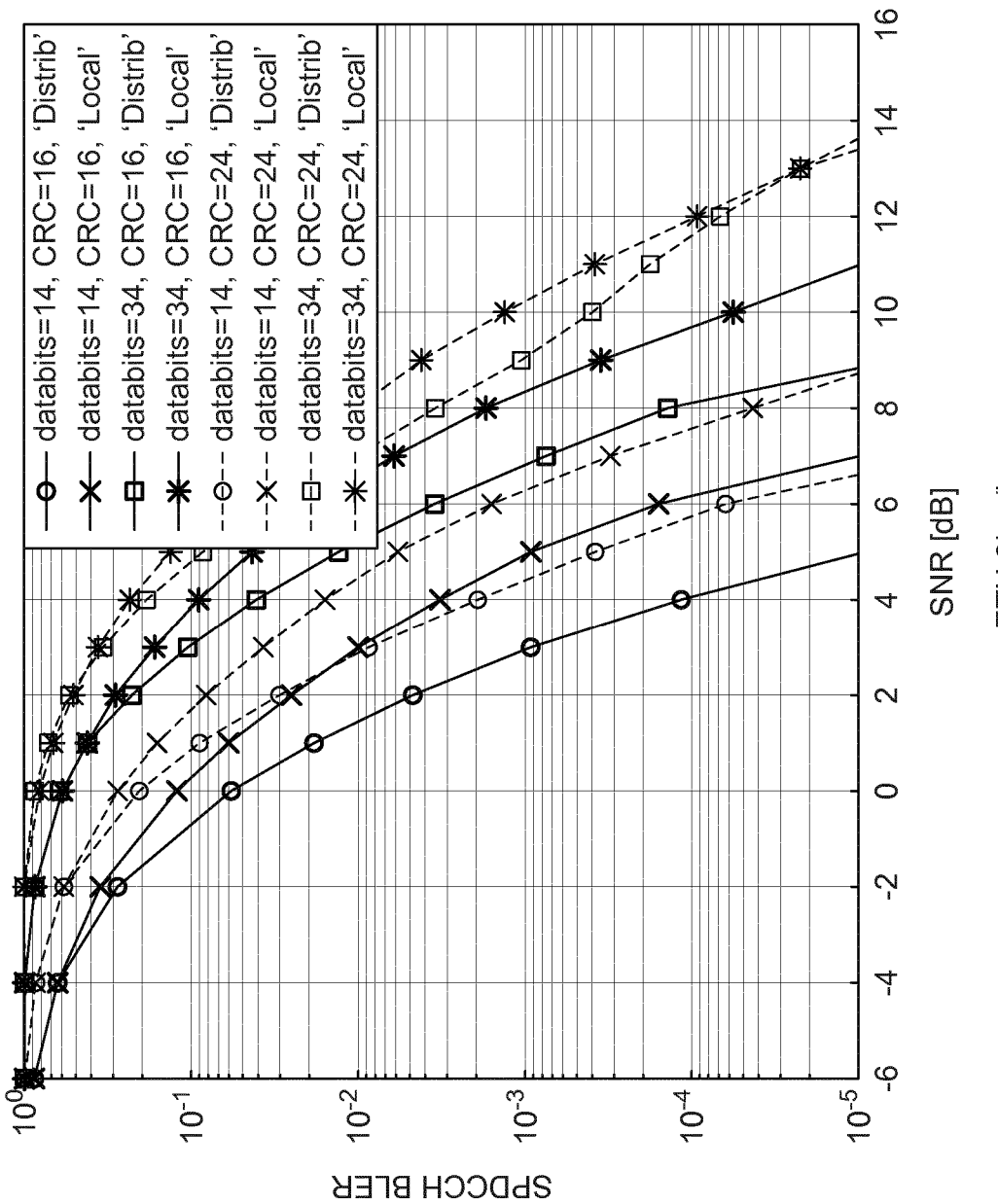

Yet other embodiments of the disclosure may include increasing sPDCCH Cyclic Redundancy Check (CRC) length. For example, it has been considered to increase sPDCCH CRC length from 16 bits to 24 bits to e.g., lower the rate of false detection and avoid additional pruning algorithms in the WD 42. A longer CRC may have some impact on control channel performance in some embodiments. FIGS. 21A-B illustrate sPDCCH block error rate (BLER) for sPDCCH of AL 1 in 10 MHz system bandwidth with an sPDCCH-PRB-set size of 18 PRBs, assuming the distributed and localized configurations for sCCE0. Exemplary results for an Extended Vehicular A (EVA) channel are shown in FIG. 21A and for an Extended Typical Urban (ETU) channel in FIG. 21B, both at 3 km/h. FIGS. 21A-B illustrate simulations both for the standard 16 bits CRC, as well as, performance when 8 additional bits are used, i.e., 24-bit CRC. As can be seen in FIGS. 21A-B, 24-bit CRC increases the code rate and BLER, leading to a loss of about 1.5-2 dB. Thus, FIGS. 21A-B illustrate link performance of different sREG mappings for one sCCE sPDCCH, with both plots including curve sets with different payloads of 14 and 34 bits (excluding the CRC) and with CRC lengths of either 16 or 24 bits. In some embodiments, the loss in demodulation performance may be compensated for by using higher ALs, which may also lead to more scheduling restrictions and larger control overhead. It may be advantageous, in some embodiments, to compare the benefits of increasing the sPDCCH CRC length with the Signal-to-Noise Ratio (SNR) loss resulting from the increased coding rate.

Some embodiments of the present disclosure are as follows:

Embodiment 1

A method in a network node for configuration of a downlink control channel for a short Transmission Time Interval, sTTI, the method comprising:
determining a predetermined set of aggregation levels to be monitored by a wireless device in a communication network, each of the aggregation levels including a number of short Control Channel Elements, sCCEs;
determining a number of downlink control channel candidates for the wireless device to monitor within each sTTI, the number of downlink channel candidates based at least upon the predetermined set of aggregation levels; and
assigning the set of aggregation levels and the downlink control channel candidates to the wireless device.

Embodiment 2

The method of Embodiment 1, wherein the downlink control channel is a short physical downlink control channel, sPDCCH.

Embodiment 3

The method of Embodiment 1, further comprising determining a downlink control channel-physical resource block, PRB,-set size for each wireless device.

Embodiment 4

The method of Embodiment 3, wherein determining the PRB-set size for each wireless device is based at least upon the number of sCCEs, a number of orthogonal frequency-division multiplexing, OFDM, symbols per control channel, and a number of short Resource Element Groups, sREGs, per sCCE.

Embodiment 5

The method of Embodiment 3, wherein two PRB-sets are defined to a wireless device for a demodulated reference signal, DMRS,-based short physical downlink control channel, sPDCCH, wherein a first PRB-set is configured as localized and a second PRB-set is configured as distributed.

Embodiment 6

The method of Embodiment 1, wherein the number of sCCEs supports the number of downlink control channel candidates defined per the set of aggregation levels for the wireless device.

Embodiment 7

The method of Embodiment 1, wherein the number of sCCEs supports wireless devices with an aggregation level greater than a predetermined level.

Embodiment 8

The method of Embodiment 1, wherein the number of sCCEs is determined based on system bandwidth.

Embodiment 9

The method of Embodiment 1, wherein the number of sCCEs is selected to avoid control overhead along available frequency resources per sTTI.

Embodiment 10

The method of Embodiment 1, wherein the number of aggregation levels to be monitored by each wireless device is three.

Embodiment 11

The method of Embodiment 1, further comprising assigning the set of aggregation levels and the downlink control channel candidates to the wireless device by at least one of radio resource control, RRC, signaling or physical downlink control channel, PDCCH, signaling.

Embodiment 12

A network node for configuration of a downlink control channel for a short Transmission Time Interval, sTTI, the network node comprising:
processing circuitry including a memory and a processor, the memory in communication with the processor, the memory having instructions that, when executed by the processor, configure the processor to:
determine a predetermined set of aggregation levels to be monitored by a wireless device in a communication network, each of the aggregation levels including a number of short Control Channel Elements, sCCEs;
determine a number of downlink control channel candidates for the wireless device to monitor within each sTTI, the number of downlink channel candidates based at least upon the predetermined set of aggregation levels; and
a communication interface configured to:
assign the set of aggregation levels and the downlink control channel candidates to the wireless device.

Embodiment 13

The network node of Embodiment 12, wherein the downlink control channel is a short physical downlink control channel, sPDCCH.

Embodiment 14

The network node of Embodiment 12, wherein the processor is further configured to determine a downlink control channel-physical resource block, PRB,-set size for each wireless device.

Embodiment 15

The network node of Embodiment 14, wherein determining the PRB-set size for each wireless device is based at least upon the number of sCCEs, a number of orthogonal frequency-division multiplexing, OFDM, symbols per control channel, and a number of short Resource Element Groups, sREGs, per sCCE.

Embodiment 16

The network node of Embodiment 14, wherein two PRB-sets are defined to a wireless device for a demodulated reference signal, DMRS,-based short physical downlink control channel, sPDCCH, wherein a first PRB-set is configured as localized and a second PRB-set is configured as distributed.

Embodiment 17

The network node of Embodiment 12, wherein the number of sCCEs supports the number of downlink control channel candidates defined per the set of aggregation levels for the wireless device.

Embodiment 18

The network node of Embodiment 12, wherein the number of sCCEs supports wireless devices with an aggregation level greater than a predetermined level.

Embodiment 19

The network node of Embodiment 12, wherein the number of sCCEs is determined based on system bandwidth.

Embodiment 20

The network node of Embodiment 12, wherein the number of sCCEs is selected to avoid control overhead along available frequency resources per sTTI.

Embodiment 21

The network node of Embodiment 12, wherein the number of aggregation levels to be monitored by each wireless device is three.

Embodiment 22

The network node of Embodiment 12, wherein the processor is further configured to assign the set of aggregation levels and the downlink control channel candidates to the wireless device by at least one of radio resource control, RRC, signaling and physical downlink control channel, PDCCH, signaling.

Embodiment 23

A method in a wireless device for implementing a set of aggregation levels and downlink control channel candidates for configuration of a downlink control channel for a short Transmission Time Interval, sTTI, the method comprising:
receiving, from a network node, an assigned set of aggregation levels, each of the aggregation levels including a number of short Control Channel Elements, sCCEs;
monitoring the assigned set of aggregation levels; and
receiving, from the network node, assigned downlink control channel candidates, the network node determining the number of downlink control channel candidates for the wireless device to monitor within each sTTI, the number of downlink channel candidates based at least upon the assigned set of aggregation levels.

Embodiment 24

The method of Embodiment 23, wherein the downlink control channel is a short physical downlink control channel, sPDCCH.

Embodiment 25

The method of Embodiment 23, wherein the number of sCCEs supports the number of downlink control channel candidates defined per the set of aggregation levels for the wireless device.

Embodiment 26

The method of Embodiment 23, wherein the number of sCCEs supports wireless devices with an aggregation level greater than a predetermined level.

Embodiment 27

The method of Embodiment 23, wherein the number of sCCEs is determined based on system bandwidth.

Embodiment 28

The method of Embodiment 23, wherein the number of sCCEs is selected to avoid control overhead along available frequency resources per sTTI.

Embodiment 29

The method of Embodiment 23, wherein the number of aggregation levels to be monitored by the wireless device is three.

Embodiment 30

A wireless device for implementing a set of aggregation levels and downlink control channel candidates for configuration of a downlink control channel for a short Transmission Time Interval, sTTI, the wireless device comprising:
a communication interface configured to:
receive, from a network node, an assigned set of aggregation levels, each of the aggregation levels including a number of short Control Channel Elements, sCCEs; and
receive, from the network node, assigned downlink control channel candidates, the network node determining the number of downlink control channel candidates for the wireless device to monitor within each sTTI, the number of downlink channel candidates based at least upon the assigned set of aggregation levels; and
processing circuitry including a memory and a processor, the memory in communication with the processor, the memory having instructions that, when executed by the processor, configure the processor to:
monitor the assigned set of aggregation levels;

Embodiment 31

The wireless device of Embodiment 30, wherein the downlink control channel is a short physical downlink control channel, sPDCCH.

Embodiment 32

The wireless device of Embodiment 30, wherein the number of sCCEs supports the number of downlink control channel candidates defined per the set of aggregation levels for the wireless device.

Embodiment 33

The wireless device of Embodiment 30, wherein the number of sCCEs supports wireless devices with an aggregation level greater than a predetermined level.

Embodiment 34

The wireless device of Embodiment 30, wherein the number of sCCEs is determined based on system bandwidth.

Embodiment 35

The wireless device of Embodiment 30, wherein the number of sCCEs is selected to avoid control overhead along available frequency resources per sTTI.

Embodiment 36

The wireless device of Embodiment 30, wherein the number of aggregation levels to be monitored by the wireless device is three.

Embodiment 37

A network node for configuration of a downlink control channel for a short Transmission Time Interval, sTTI, the network node comprising:
  an aggregation level determination module configured to:
  determine a predetermined set of aggregation levels to be monitored by a wireless device in a communication network, each of the aggregation levels including a number of short Control Channel Elements, sCCEs;
  a downlink control channel candidate determination module configured to:
  determine a number of downlink control channel candidates for the wireless device to monitor within each sTTI, the number of downlink channel candidates based at least upon the predetermined set of aggregation levels; and
  a communication interface module configured to:
  assign the set of aggregation levels and the downlink control channel candidates to the wireless device.

Embodiment 38

A wireless device for implementing a set of aggregation levels and downlink control channel candidates for configuration of a downlink control channel for a short Transmission Time Interval, sTTI, the wireless device comprising:
  a communication interface module configured to:
  receive, from a network node, an assigned set of aggregation levels, each of the aggregation levels including a number of short Control Channel Elements, sCCEs; and
  receive, from the network node, assigned downlink control channel candidates, the network node determining the number of downlink control channel candidates for the wireless device to monitor within each sTTI, the number of downlink channel candidates based at least upon the predetermined set of aggregation levels; and
  an aggregation level monitoring module configured to:
  monitor the assigned set of aggregation levels.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object-oriented programming language such as Java® or C++. However, the computer program code for carrying out operations of the disclosure may also be written in conventional procedural programming languages, such as the "C"

programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings, which is limited only by the following claims.

What is claimed is:

1. A method in a network node for supporting a predetermined set of aggregation levels for configuration of a downlink control channel for one of a slot Transmission Time Interval, TTI, and a subslot TTI, the method comprising:
    determining an aggregation level of the predetermined set of aggregation levels to be monitored by a wireless device, WD, in a communication network; and
    determining a number of downlink control channel candidates for the WD to monitor within each of the one of the slot TTI and the subslot TTI, the number of downlink control channel candidates being based upon the aggregation level and based on a maximum number of downlink control channel candidates across the predetermined set of aggregation levels.

2. The method according to claim 1, further comprising: assigning the aggregation level and the downlink control channel candidates to the WD.

3. The method according to claim 1, wherein determining the number of downlink control channel candidates for the WD to monitor within each of the one of the slot TTI and the subslot TTI comprises at least determining the number of downlink control channel candidates for the WD to monitor within each of the one of the slot TTI and the subslot TTI based at least on a maximum of six downlink control channel candidates to be monitored within each of the one of the slot TTI and the subslot TTI.

4. The method according to claim 1, wherein determining the number of downlink control channel candidates for the wireless device to monitor within each of the one of the slot TTI and the subslot TTI comprises determining up to two downlink control channel candidates in high aggregation levels.

5. The method according to claim 1, wherein the maximum number of downlink control channel candidates is six.

6. The method according to claim 1, wherein the downlink control channel is a short physical downlink control channel, sPDCCH.

7. A network node for supporting a predetermined set of aggregation levels for configuration of a downlink control channel for a one of a slot Transmission Time Interval, TTI, and a subslot TTI, the network node comprising processing circuitry configured to:
    determine an aggregation level to be monitored by a wireless device, WD, in a communication network; and
    determine a number of downlink control channel candidates for the WD to monitor within each of the one of the slot TTI and the subslot TTI, the number of downlink control channel candidates being based upon the aggregation level and based on a maximum number of downlink control channel candidates across the predetermined set of aggregation levels.

8. The network node according to claim 7, wherein the processing circuitry is further configured to assign the aggregation level and the downlink control channel candidates to the WD.

9. The network node according to claim 7, wherein the processing circuitry is further configured to determine the number of downlink control channel candidates for the WD to monitor within each of the one of the slot TTI and the subslot TTI based at least on a maximum of six downlink control channel candidates to be monitored within each of the one of the slot TTI and the subslot TTI.

10. The network node according to claim 7, wherein the processing circuitry is further configured to determine up to two downlink control channel candidates in high aggregation levels.

11. The network node according to claim 7, wherein the maximum number of downlink control channel candidates is six.

12. The network node according to claim 7, wherein the downlink control channel is a short physical downlink control channel, sPDCCH.

13. A method in a wireless device, WD, for supporting a predetermined set of aggregation levels and for implementing at least one aggregation level and at least one downlink control channel candidate for configuration of a downlink control channel for one of a slot Transmission Time Interval, TTI, and a subslot TTI, the method comprising:
    receiving, from a network node, an assigned aggregation level to be monitored by the WD in a communication network; and
    receiving, from the network node, assigned downlink control channel candidates, the network node determining a number of downlink control channel candidates for the WD to monitor within each of the one of the slot TTI and the subslot TTI, the number of downlink control channel candidates being based upon the assigned aggregation level and based on a maximum number of downlink control channel candidates across the predetermined set of aggregation levels.

14. The method according to claim 13, wherein receiving, from the network node, the assigned aggregation level to be monitored by the WD in the communication network comprises receiving, by Radio Resource Control, RRC, signaling from the network node, the assigned aggregation level to be monitored by the WD in the communication network.

15. The method according to claim 13, further comprising monitoring the assigned aggregation level.

16. The method according to claim 13, wherein the number of downlink control channel candidates is based at least on a maximum of six downlink control channel candidates to be monitored within each of the one of the slot TTI and the subslot TTI.

17. The method according claim 13, wherein the number of downlink control channel candidates is up to two downlink control channel candidates in high aggregation levels.

18. The method according to claim 13, wherein the maximum number of downlink control channel candidates is six.

19. The method according to claim 13, wherein the downlink control channel is a short physical downlink control channel, sPDCCH.

20. A wireless device, WD, for supporting a predetermined set of aggregation levels and for implementing at least one aggregation level and at least one downlink control channel candidate for configuration of a downlink control channel for one of a slot Transmission Time Interval, TTI, and a subslot TTI, the WD comprising processing circuitry configured to:
    receive, from a network node, an assigned aggregation level to be monitored by the WD in a communication network; and
    receive, from the network node, assigned downlink control channel candidates, the network node determining a number of downlink control channel candidates for the WD to monitor within each of the one of the slot TTI and the subslot TTI, the number of downlink control channel candidates being based upon the assigned aggregation level and based on a maximum number of downlink control channel candidates across the predetermined set of aggregation levels.

21. The WD according to claim 20, wherein the processing circuitry is further configured to receive, by Radio Resource Control, RRC, signaling from the network node, the assigned aggregation level to be monitored by the WD in the communication network.

22. The WD according to claim 20, wherein the processing circuitry is further configured to monitor the assigned aggregation level.

23. The WD according to claim 20, wherein the number of downlink control channel candidates is based at least on a maximum of downlink control channel candidates to be monitored within each of the one of the slot TTI and the subslot TTI.

24. The WD according claim 20, wherein the number of downlink control channel candidates is up to two downlink control channel candidates in high aggregation levels.

25. The WD according to claim 20, wherein the maximum number of downlink control channel candidates is six.

26. The WD according to claim 20, wherein the downlink control channel is a short physical downlink control channel, sPDCCH.

27. The WD according to claim 20, wherein the aggregation level includes a number of short Control Channel Elements, sCCEs.

28. The WD according to claim 27, wherein the number of sCCEs supports a number of downlink control channel candidates defined per aggregation level of the predetermined set of aggregation levels to be monitored by the WD.

* * * * *